United States Patent [19]

Polo

[11] 4,208,992
[45] Jun. 24, 1980

[54] ELECTRONIC IGNITION SYSTEM

[76] Inventor: Benito Polo, 9446 Borson St., Downey, Calif. 90241

[21] Appl. No.: 888,106

[22] Filed: Mar. 20, 1978

[51] Int. Cl.² .................................................. F02P 5/04
[52] U.S. Cl. ............................. 123/117 R; 123/148 E; 123/117 D
[58] Field of Search ....... 123/117 R, 148 E, 148 ND, 123/117 D

[56] References Cited

U.S. PATENT DOCUMENTS

| | | | |
|---|---|---|---|
| 3,202,146 | 8/1965 | Short et al. | 123/148 E |
| 3,357,416 | 12/1967 | Huntzinger | 123/148 E |
| 3,368,539 | 2/1968 | Kidwell | 123/148 E |
| 3,800,757 | 3/1974 | Finch | 123/148 E |
| 3,923,029 | 12/1975 | Polo | 123/148 E |
| 3,945,362 | 3/1976 | Neumann et al. | 123/148 E |
| 3,989,024 | 11/1976 | Lai et al. | 123/117 R |
| 3,990,417 | 11/1976 | Tershak | 123/117 R |
| 4,015,564 | 4/1977 | Fitznor | 123/117 R |
| 4,033,305 | 7/1977 | Maigolio et al. | 123/117 D |
| 4,036,190 | 7/1977 | Bigliani et al. | 123/117 D |
| 4,041,912 | 8/1977 | Sessions | 123/148 E |
| 4,052,967 | 10/1977 | Colling et al. | 123/117 D |
| 4,102,311 | 7/1978 | Crall et al. | 123/117 R |
| 4,104,997 | 8/1978 | Padgitt | 123/148 E |
| 4,124,009 | 11/1978 | Hill et al. | 123/148 E |
| 4,126,112 | 11/1978 | Tershak | 123/117 R |
| 4,127,092 | 11/1978 | Fresow et al. | 123/117 R |
| 4,131,097 | 12/1978 | Sawada et al. | 123/117 R |
| 4,133,323 | 1/1979 | Adler | 123/117 R |

FOREIGN PATENT DOCUMENTS 239784 2/1975 Fed. Rep. of Germany ... 123/148 ND

Primary Examiner—Charles J. Myhre
Assistant Examiner—Raymond A. Nelli
Attorney, Agent, or Firm—Nilsson, Robbins, Dalgarn, Berliner, Carson & Wurst

[57] ABSTRACT

A distributorless electronic ignition system for replacing the entire traditional spark distributor system in an internal combustion engine. First timing pulses, generated in a first pulse generator by electromagnetically sensing the magnetic discontinuities of one or more lobed discs fixed to the engine crankshaft, are coupled to a second pulse generator which generates a second timing signal. The second timing signals are coupled to an electronic shaft means which generates a shaft position signal and shaft rate signal which are added to form a composite signal whose amplitude increases as the speed of the engine increases. An advance signal pulse is initiated each time the composite signal amplitude increases to a value equal to a reference voltage defining the basic idle timing. The pulse width of each advance signal pulse is then modified in a pulse width control circuit to form a spark enable signal having a time duration equal to the time duration desired for the sparks. The spark enable signal as well as the first timing signal are combined in an electronic distributor to sequentially generate ignition spark signals on a plurality of leads, each coupled to spark plugs positioned in a pair of cylinders having the same relative position with one being in the combustion phase and the other being in the exhaust phase of the combustion cycle. Spark modulation to provide multiple ignition sparks during each spark enable pulse is also provided by ANDing the spark enable pulse with a high frequency pulse signal from a signal generator.

10 Claims, 11 Drawing Figures

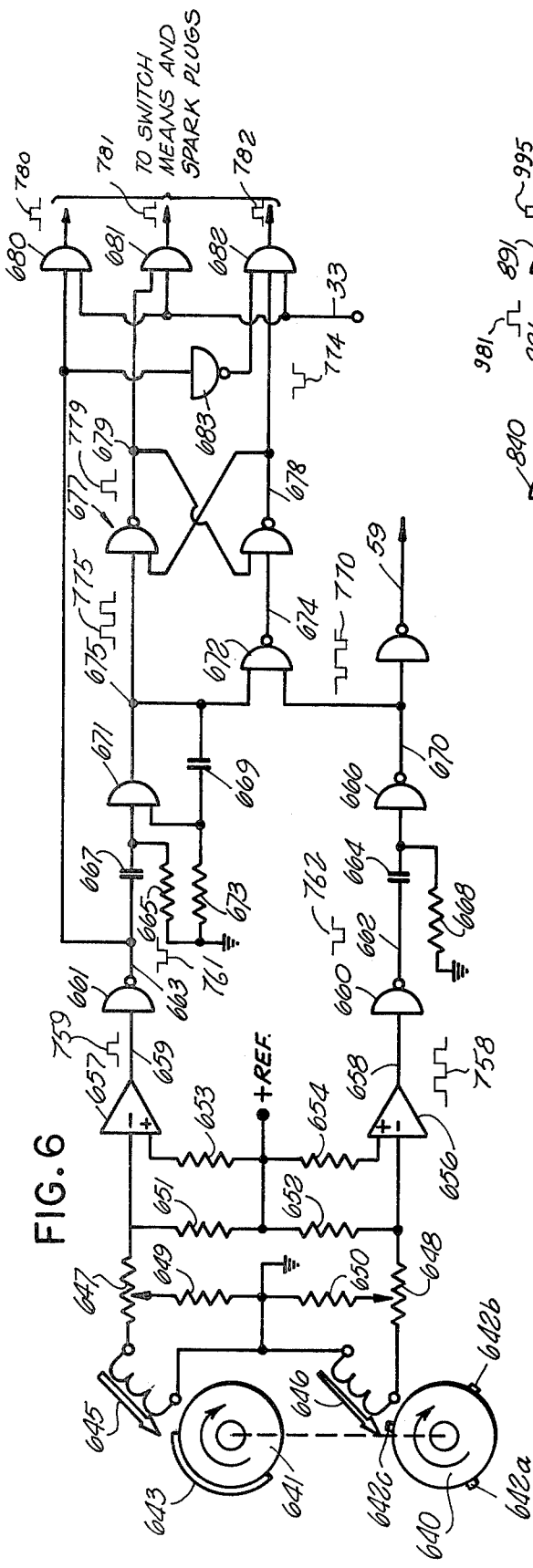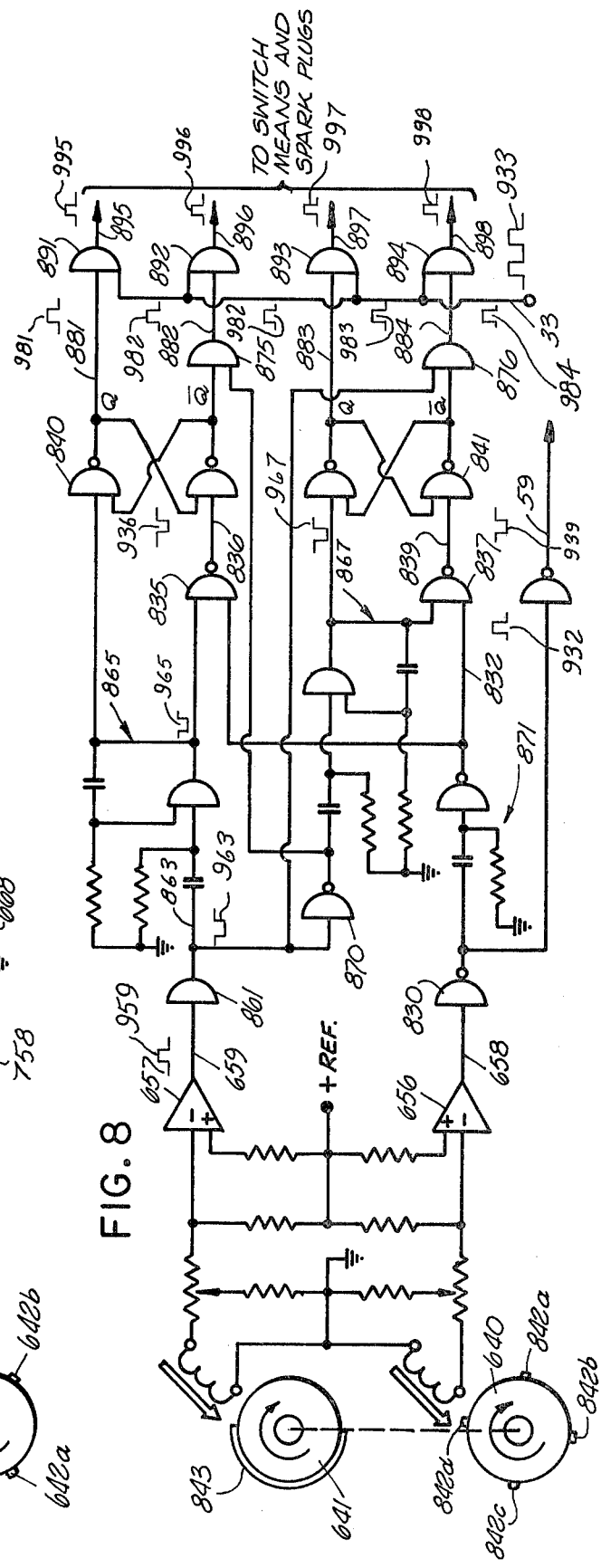

ELECTRONIC IGNITION SYSTEM

BACKGROUND OF THE INVENTION

It has long been known that to provide maximum burning of the air-fuel mixture in the cylinder of an internal combustion engine, there must be provided an appropriate spark of sufficient magnitude and duration. The time required for complete combustion of the air-fuel mixture is approximately one millisecond. It has also been known that this millisecond burning time is relatively constant as engine speed increases. Thus, in order to provide properly timed combustion to efficiently transmit the power generated to the engine's crankshaft, the initiation of the spark must be advanced as engine speed increases.

With prior art ignition systems utilizing traditional breaker-points, condenser and mechanical spark timing advance mechanisms in conjunction with the battery, coil and distributor, various difficulties were encountered resulting in compromises as to coil design and duration of the spark to achieve sufficient voltage at all engine speeds without imparting damage to the remainder of the ignition system. Even so, at relatively high engine speed, it was found that the air-fuel mixture introduced into the cylinders was only partially or improperly burned in many instances. As a result, undesirable pollutants were introduced into the atmosphere. Furthermore, it was found that the various mechanical components comprising a bulk of the ignition system were in constant need of repair, adjustment or replacement as a result of wear.

In addition, the mechanical spark timing advance mechanisms, which took the form of camshaft springs and weights commonly referred to as contrifugal spark timing advance mechanisms, and pneumatic actuators commonly known as vacuum spark timing advance mechanisms, frequently introduced inaccuracies that became worn in relatively short periods of use. Also, difficulties were frequently encountered in adjustment and maintenance resulting in incomplete burning and, thus, the generation of air pollution.

In an attempt to solve some of the foregoing problems, various electronic ignition systems have been developed. Representative of such systems are those described in U.S. Pat. Nos. 3,202,146; 3,363,615; 3,368,539; 3,357,416; 3,434,462; 3,587,552; 3,592,172; 3,660,689; 3,756,212; 3,800,757; 3,811,420; 3,991,730 and 4,041,912. Although these electronic ignition systems solved some of the problems inherent in the mechanical systems heretofore used, difficulties remained. For example, these systems continue to require the traditional spark distributor with its mechanical limitations and some still incorporate mechanical spark advance mechanisms. Thus, many of the prior art problems continue to persist.

In those instances where mechanical apparatus has been replaced with electronic devices, reliance is placed upon the ability of an electronic oscillator to detect the passage of a metal part which changes the Q of a resonant circuit to thereby detect the speed of the engine and provide an ignition advance signal. In other cases where a sawtooth waveform is used, a lack of precision imposes limitations at certain engine speeds. In addition, the traditional spark distributor, with its known limitations, is retained. In my prior electronic ignition system U.S. Pat. No. 3,923,029, filed Apr. 17, 1974, many of these deficiencies were solved by providing an electronic timing advance circuit as well as improved switching capabilities, among other things. In addition, solutions were suggested in which ramp signals representative of shaft portion were utilized. However, such position signals were generated directly from and dependent upon the input signal from the magnetic detector. The present invention generates the ramp signal independently of any input signal and requires merely a synchronization control signal from time to time. In the present invention, a further improved electronic timing advance circuit in conjunction with an all electronic distributor, capable of being modulated with a high frequency signal, is provided to eliminate many of the previously mentioned problems.

SUMMARY OF THE INVENTION

An electronic ignition system is provided for generating ignition sparks for the combustion of gases in an internal combustion engine. The internal combustion engine is of a type having a rotating crankshaft with a plurality of combustion chambers. A first pulse generator is provided for generating a first timing signal having pulses which occur at a frequency proportional to the speed of the engine. The first pulse generator incorporates an electromagnetic pick-up mechanism for sensing electromagnetic discontinuities due to steel or iron lobes positioned on a plate fixed to the crankshaft of the engine.

A second pulse generator apparatus is coupled to the first pulse generator to receive the first timing signal and generate therefrom a synchronization signal having pulses with a variable time duration so that the ratio between the synchronization signal pulse width and the time interval between the leading edges of synchronization signal pulses remains substantially constant. Thus, the first timing signal pulses and the synchronization signal pulses have substantially coincident leading edges (but different pulse widths).

The synchronization signal is then applied to an electronic shaft means which is essentially an analog computer loop which acts as a motion predictor for that internally generating both a position signal and a rate signal, respectively, representative of the angular position of the crankshaft and the angular rate of the crankshaft. The rate signal is coupled to the second pulse generator where it is utilized to control the pulse width of the synchronization signal pulses.

The angular position and rate signals are summed in a shaft angle and rate mixer circuit to form a composite signal comprised of a series of ramps having variable peak amplitudes which are proportional by the rate signal amplitude. An advance signal having pulses advanced by an amount proportional to the speed of the engine is obtained in a timing advance detector circuit which compares the composite signal from the angle and rate mixer with a constant voltage level from the basic timing circuit and a vacuum advance bias switch circuit, with the leading edge of each advance signal pulse occurring whenever the composite signal increases to a value equal to the basic timing constant voltage level. The shaft angle and rate mixer, timing advance detector, basic timing circuit and vacuum advance bias switch comprise a third pulse generator.

The advance signal is then inputted to a variable pulse width generator to generate spark advance signal pulses having leading edges coincident with the leading edges of the advance signal pulses but a pulse width defined to be the optimal duration of the spark for the engine spark plugs which may be set by manual adjustment of the variable pulse width generator. The resultant spark advance signal pulses or the synchronization signal is selectively coupled to an electronic distributor means. The electronic distributor means, which includes a solid state distributor and a high frequency pulse generator, sequentially applies the resultant ignition spark signal pulses to a plurality of output leads where each lead is coupled to a pair of spark plugs one in each of two cylinders operating 180° out of phase relative to the total combustion cycle. Thus, ignition sparks are provided to the spark plug in the chamber which is in the exhaust stage as well as the chamber in the combustion stage. This technique provides additional burning of unburned gases in the exhaust to provide lower pollution levels.

The high frequency pulse generator provides a high frequency modulation signal for combination with each spark signal pulse sequentially provided on the various leads from the solid state distributor to thereby provide multiple sparks in each cylinder during each ignition spark signal pulse period. Exclusive clocking pulses are provided in the solid state distributor so that each ignition spark signal pulse is enabled to activate an appropriate power amplifier semiconductor switch, transformer ignition coil and spark plug thereby replacing the traditional high tension spark distributor. Each output lead from the solid state distributor is coupled to a switching power amplifier which controls a transformer ignition coil that generates high voltage sparks for every pair of spark plugs.

BRIEF DESCRIPTION OF THE DRAWINGS

FIG. 6 is a schematic circuit diagram illustrating the present invention as adapted for a six cylinder engine.

FIG. 8 is a schematic circuit diagram illustrating the present invention as adapted for an 8 cylinder engine.

DETAILED DESCRIPTION OF THE PREFERRED EMBODIMENT

Figure 1:
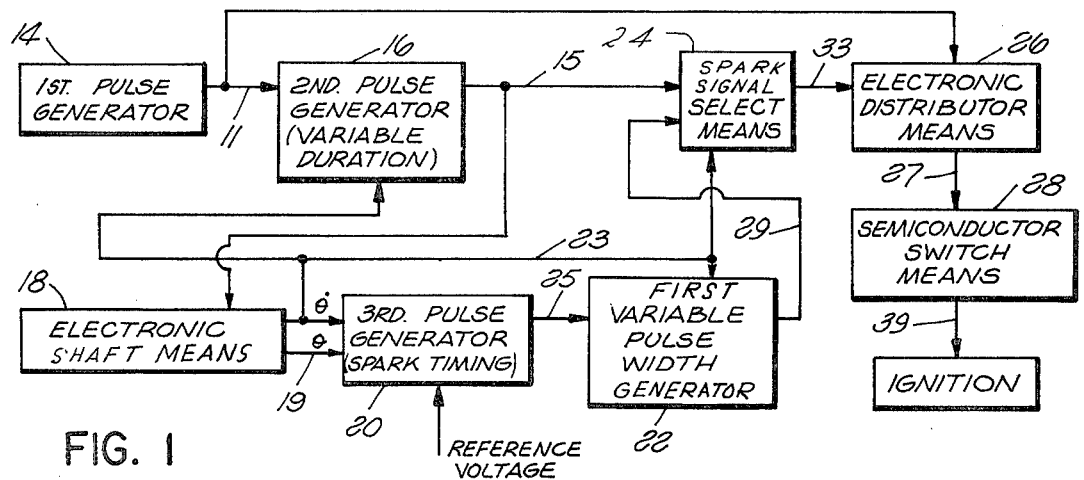
FIG. 1 is a simplified block diagram illustrating the electronic ignition system in accordance with the present invention.

As illustrated in FIG. 1, an electronic ignition system for an internal combustion engine in accordance with the present invention includes a first pulse generator 14 adapted for providing a first timing signal on a lead 11, which signal comprises a series of pulses having a predetermined fixed amplitude and duration. The frequency of the first timing signal pulses is proportional to the speed of the internal combustion engine and each rise or fall of the first timing signal pulse represents a particular crankshaft angular position. The first timing signal on the lead 11 is coupled to a second pulse generator 16 which generates a synchronization signal on a lead 15, which signal comprises a plurality of pulses of predetermined amplitude. Each of the pulses comprising the synchronization signal has a leading edge substantially coincident with the leading edge of the pulses comprising the first timing signal and a trailing edge which is caused to occur at variable times not necessarily coincident with the trailing edge of the pulses comprising the first timing signal. The synchronization signal is generated so as to maintain a constant ratio between the synchronization signal pulse width, which is partially representative of the engine crankshaft angle, and the time duration between the leading edges of consecutive synchronization signal pulses.

The synchronization signal pulses from the second pulse generator 16 are next coupled as a synchronization control via lead 15 to an electronic shaft means 18 which internally generates a rate signal on lead 23 (through an integral with respect to time of the second derivative) representative of the engine speed and a position signal on the lead 19 representative of the angular position of the rotating shaft of the internal combustion engine. The rate signal on lead 23 is fed back to the second pulse generator 16 to provide a control signal whereby the trailing edge of the synchronization signal pulses (or leading edge if the polarity is reversed) are determined. In response to the trailing edge of the synchronization signal pulses, which operate as synchronizing control signals, on lead 15, the electronic shaft means 18 initiates a ramp waveform which is independent of the synchronization signal pulses and represents the position signal on the lead 19. The slope and duration of the ramp waveform varies as a function of the time integral of the rate signal appearing on the lead 23. The electronic shaft means 18 internally generates all necessary derivatives with respect to time of the engine's crankshaft angular position. The integral with respect to time of the second derivative internally generates angular rate.

It will be appreciated that the time duration between the leading edges of consecutive synchronization signal pulses represents the time it takes for the engine's crankshaft to rotate through 180°. The trailing edge of the synchronization signal can be adjusted in the second pulse generator to occur at a time when the engine's crankshaft has rotated through from about 10° up to about 120°. Thus, with the ramp waveform initiated on the trailing edge of the synchronization signal, a timing advance range adjustment can be obtained by adjusting the time when the trailing edge of the synchronization signal pulses occur to correspond to the desired crankshaft angle advance, that is, from about 10° to 120° in the present four cylinder embodiment.

The rate signal on lead 23 and the position signal on lead 19 are applied to a third pulse generator 20 which generates an advance signal on lead 25. The advance signal on lead 25 comprises a plurality of pulses, each having a trailing edge substantially coincident with the leading edge of the synchronization signal pulses on the lead 15. The occurrence of the leading edge of the advance signal 25 is determined by generating a composite signal internally to the third pulse generator 20 which is the algebraic sum of the rate signal on lead 23 and the position signal on lead 19. The resultant composite signal is then compared to a reference voltage representative of the basic idle timing of the engine. The leading edge of the advance signal on the lead 25 occurs when the increasing voltage of the composite signal reaches a value equal to the reference voltage. Thus, the leading edge of the advance signal occurring on lead 25 will precede the leading edge of the first timing signal on lead 11 to provide an advance for a subsequently generated spark enable signal. The amount by which this leading edge of the advance signal precedes the leading edge of the first timing signal is proportional to the rate signal from the electronic shaft means and thus the engine speed.

The lead 25 is next coupled to a first variable pulse width generator 22 to generate a spark advance signal on a lead 29. The spark advance is comprised of a plurality of pulses each having a leading edge substantially coincident with the leading edge of the advance signal appearing on lead 25. However, the trailing edge of the spark advance signal pulses are initiated by the first variable pulse width generator 22 so as to maintain a constant time ratio between the pulse width of the advance signal pulses and the time duration between consecutive leading edges of the advance signal pulses. In the preferred embodiment of the present invention, the initiation of the trailing edge of the spark advance signal pulses is controlled by the rate signal of the electronic shaft means 18 which is also coupled to the first variable pulse width generator 22.

In the preferred embodiment of the present invention, a spark signal select means 24 is also provided having a first input coupled to the lead 15 from the second pulse generator 16 and a second input coupled to the lead 29 from the first variable pulse width generator 22. A control input is also provided and coupled to the lead 23 from the electronic shaft means 18. In effect, the spark signal select means 24 operates as a switch under the control of the rate signal on the lead 23. Thus, if the value of the rate signal appearing on the lead 23 is below a defined amount thereby indicating an engine speed below a set number of rpm's, for example 600 rpm's, then no advance of the timing signal is required and the spark signal select means couples the synchronization signal from the lead 15 to the output on a lead 33 to form the spark enable signal. On the other hand, if the rate signal on the lead 23 is greater than a set value, the spark signal select means 24 couples the spark advance signal on the lead 29 to the lead 33 to form the spark enable signal.

The outputted spark enable signal from the spark signal select means 24 on the lead 33 (which may be either the synchronization signal on the lead 15 or the spark advance signal on the lead 29) is then coupled to an electronic distributor means 26. The electronic distributor 26 of the preferred embodiment is coupled to the lead 11 to therefrom generate distributor ignition spark signals to the semiconductor switch means 28 along the lead 27 to thereby enable signals on the leads 39 to cause a spark to sequentially occur in the various cylinders thereby causing ignition.

Figure 2:
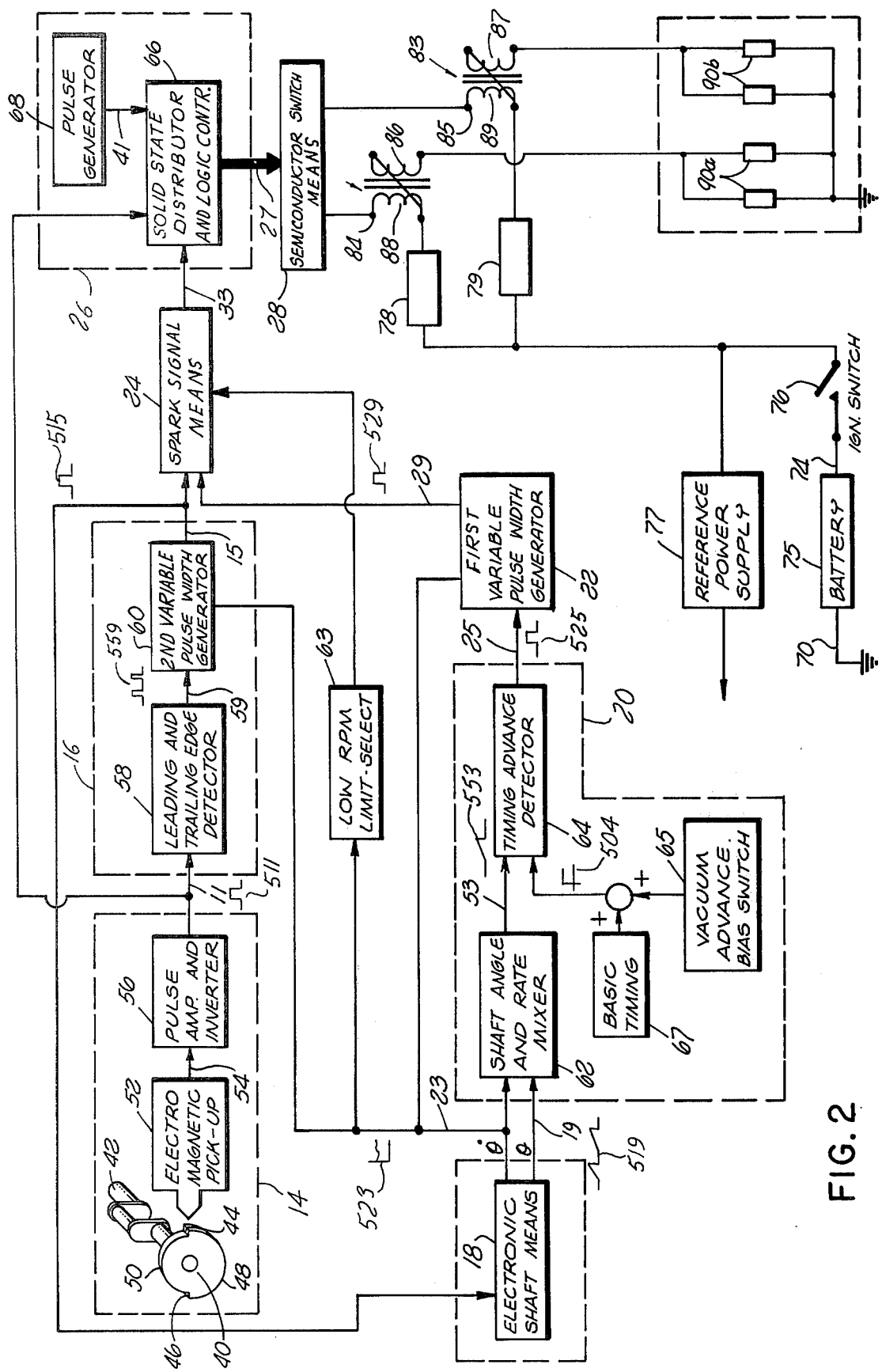
FIG. 2 is a more detailed block diagram illustrating an electronic ignition system for a four cylinder engine in accordance with the present invention.

Referring more particularly to FIG. 2, there is shown a more detailed block diagram illustrating the present invention as incorporated in a typical four cylinder internal combustion engine. The first pulse generator 14 is shown comprising a crankshaft 42, an electromagnetic pick-up 52 coupled by a lead 54 to a pulse amplifier and inverter 56. The shaft 42 incorporates an iron disc 40 which is fixed to the crankshaft 42 and is thus rotated thereby. In one embodiment, the disc 40 incorporates a first lobe 48 and a second lobe 50 which is smaller in diameter, joined by the surfaces 44 and 46. The lobes 48 and 50 are equiangularly disposed about the periphery of the disc 40, each having a constant diameter relative to the rotating axis of the crankshaft 42. The number of lobes on the disc 40 represents the number of spark plugs which will fire and initiate combustion in the combustion phase in each cylinder. Thus, for the four cylinder engine illustrated in FIG. 2, two spark plugs will fire causing such combustion during each revolution of the disc 40. Although the disc 40 is shown to be lobed, other configurations may be utilized. Thus, the lobes may be replaced by notches or a nonferrous disc may be utilized with magnetic material at spaced positions thereabout.

Figure 5:
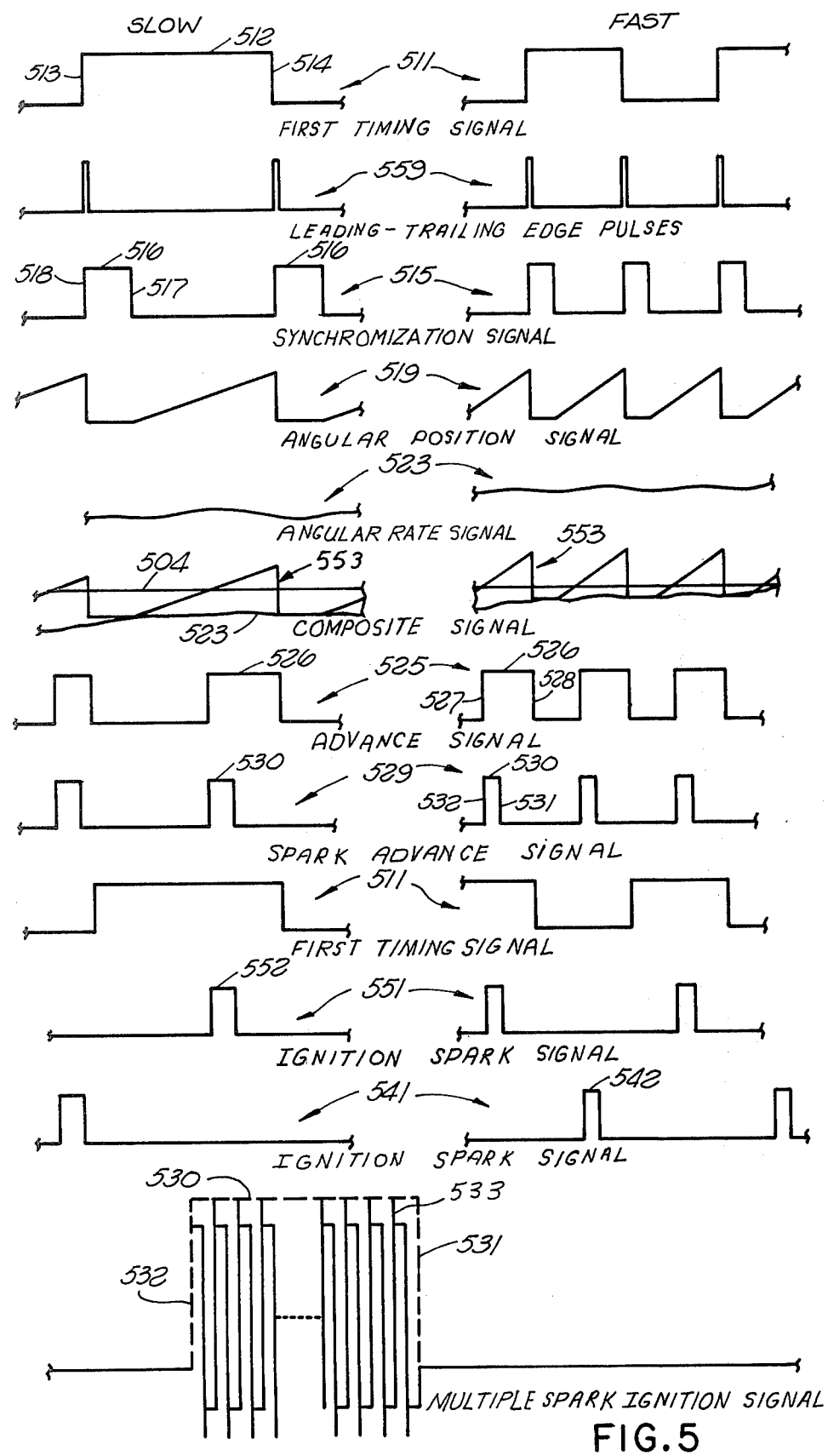
FIG. 5 is a diagram illustrating waveforms taken at various points throughout the circuit of FIG. 4.

The electromagnetic pick-up 52 is provided to be in close proximity to the disc 40 thereby allowing it to sense the magnetic discontinuities in the notches, protrusions or ferrous inserts in the disc 40 and generate therefrom a signal on the lead 54. The signal is amplified and inverted in the pulse amplifier and inverter 56 to generate the first timing signal 511 illustrated in FIG. 5, on the lead 11. Again referring to FIG. 5 in conjunction with FIG. 2, the first timing signal comprises a plurality of pulses 512 each having a leading edge 513 and a trailing edge 514 which correspond to and indicate the angular position of the crankshaft. The first timing signal is coupled to the second pulse generator 16 which comprises a leading and trailing edge detector 58 to generate pulses 559 on the lead 59 in the manner described in my previous U.S. Pat. No. 3,923,029, filed Apr. 17, 1974, such pulses being generated whenever there is either a trailing or a leading edge in the first timing signal 511 and hence a crankshaft angular position. Each waveform in FIG. 5 is shown in two parts, the first representing a slow speed and the second a faster speed.

The lead 59 couples the signal 559 to a controlled AND gate also called herein a second variable pulse width generator 60 to generate the synchronization signal 515 on the lead 15. The synchronization signal 515 comprises a plurality of pulses 516, each having a leading edge 518 and a trailing edge 517 representative of a specific angular position of the crankshaft. In operation, the synchronization signal 515 is supplied along the lead 15 to the electronic shaft means 18 (shaft motion predictor means ) to synchronize the electronic shaft means angular position to the actual crankshaft angular position. This synchronization occurs on each trailing edge of the synchronization occurs on each trailing edge of the synchronization signal 515 which causes the electronic shaft means to initiate generation of a ramp waveform 519.

Incorporated as part of the electronic shaft means 18 is an integrator, to be subsequently described, whose input, which operates as a mode control, is coupled to receive the synchronization signal 515 so that the integrator commences integration upon the trailing edge 517 of the synchronization signal 515. In addition, each leading edge 518 of the synchronization signal 515 resets the integrator to its initial value, preferably zero volts, where it remains during the duration of each pulse 516. The trailing edge of the output of the second variable pulse width generator 60 is adjustable to allow the timing to be adjusted. Thus, the synchronization signal 515 periodically synchronizes the electronic shaft means with the actual engine crankshaft position to form the ramp waveform which is the angular position signal 519 appearing on a lead 19 and is representative of the angular position of the engine's crankshaft.

The electronic shaft means 18 also internally generates the angular rate signal 523 appearing on the lead 23 which is representative of the angular rate at which the engine's crankshaft is rotating. The position signal 519 and the rate signal 523 appearing on the leads 19 and 23, respectively, are coupled to the shaft angle and rate mixer 62 where they are added with appropriate gains to genetrate a composite signal 523 (FIG. 5) on the lead 53. The composite signal 553 is then applied as an input to a timing advance detector 64 where it is compared to a basic timing reference voltage 504 which is input to the timing advance detector 64 from a basic timing means 67. The comparison between the basic timing signal 504 and the composite signal 553 results in the generation of the advance signal 525 appearing on the lead 25 which comprises a series of pulses 526 each having a trailing edge 528, substantially coincident with the leading edge 518 of the pulses 516 of the synchronization signal 515, and a leading edge 527 initiated when the composite signal 553 has increased in voltage to a point at which it is equal to the reference voltage 504.

Although not necessary, a vacuum advance bias switch 65, which senses the vacuum present at the intake manifold of the internal combustion engine, may be provided to automatically inject a predetermined amount of bias into the timing advance detector 64. Such bias may be added to the basic timing signal 504 to effectively shift the basic timing signal 504 by a predetermined amount to thus appropriately advance the spark's timing in response to engine load conditions.

The advance signal 525 (FIG. 5) on the lead 25 is applied as an input to the first variable pulse width generator 22, as is the rate signal 523 along the lead 23. The rate signal 523 is a control to define the occurrence of the trailing edge 531 of the pulses 530 on the spark advance signal 529. The resultant spark advance signal 529 on the lead 29 initiates the spark on the leading edge 532 and terminates the spark on the trailing edges 531.

The spark advance signal pulses 530 on the lead 29 are then applied as an input to the spark signal select means 24, as is the synchronization signal along the lead 15. The selection of either the spark advance signal 529 on the lead 29 or the synchronization signal 515 on the lead 15 is determined by a low rpm limit select circuit 63 which is coupled to receive the rate signal 523 on the lead 23 and generate a control signal input to the spark select means 24. The spark select means enables either the signal on lead 15 or the signal on lead 29 depending on whether the engine speed, as defined by the rate signal, is below a certain value and thus indicating that the engine is running below the selected speed, e.g., 600 rpm's. More specifically, if the engine speed is under 600 rpm's, the low rpm limit select 63 generates a lower signal output which causes the synchronization signal on the lead 15 to be selected and, if the engine speed is above 600 rpm's, the low rpm limit select detector 63 generates a high signal output thereby causing the spark advance signal 529 to be selected. The resultant spark enable signal from the spark signal select means 24 is then applied as an input to the solid state distributor 66 along the lead 33 and channels those pulses to initiate a spark in the appropriate spark plug.

In the preferred embodiment of the present invention, this result may be obtained by applying the first timing signal 511 on the lead 11 to the solid state distributor 66. Individual output leads 27 are then provided to each spark plug circuit. Appropriate logic, controlled by the first timing signal, sequentially applies the spark enable signal on the lead 33 to each of the output leads 27 from the solid state distributor 66 thereby sequentially providing ignition spark signals to the various spark plugs.

In the preferred embodiment of the present invention, each ignition spark signal is simultaneously provided to two spark plugs to generate a spark during both the ignition phase of the combustion cycle and the exhaust phase of the combustion cycle thereby igniting any gases which may be left in the exhaust and to thus provide a cleaner burning engine. Referring to FIG. 5, a representative ignition spark signal 551 for one of a pair of leads in a four cylinder engine and a representative ignition spark signal 541 to a second pair of leads from the solid state distributor 66 for a four cylinder engine are illustrated. By ANDing the first timing signal 511 with the spark advance signal signal 529, alternative pulses are selected and outputted on one lead 27 to form the ignition spark signal 551 supplied by the solid state distributor to cause ignition sparks in two cylinders. Alternate pulses of the spark enable signal 529 are selected by ANDing the spark enable signal 529 with the inverse of the first timing signal 511 to obtain the ignition spark signal 541 on the second lead of the solid state distributor 66.

Also coupled to the solid state distributor 66 of the preferred embodiment, is the pulse generator 68 which provides a high frequency modulation signal along the lead 41. This signal is ANDed with the output spark enable signal 529 to thereby modulate the ignition spark signals to cause multiple, alternating polarity sparks during each ignition spark signal as illustrated by the multiple spark ignition signal 533.

In order to generate the sparks in the spark plugs of the engine, a battery 75 is provided with one terminal 70 connected to a point of common reference, such as ground 72, while the other terminal 74 is connected to an ignition switch 76. The ballast resistors 78 and 79 are connected between the ignition switch 76 and terminals 80 and 81 of the ignition coils 82 and 83, respectively. The other terminals 84 and 85 of the ignition coils 82 and 83 are coupled to the semiconductor switch means 28. The semiconductor switch means 28 is operated in response to the ignition spark signals 541 and 551 on the leads 27 as previously described. The secondary coils 86 and 87 of the ignition coils 82 and 83 are respectively coupled to the spark plug pair 90a and the spark plug pair 90b. Thus, after the ignition switch 76 is closed, the battery current is continuously applied to the primary winding 88 and 89 of the ignition coils 82 and 83 and through the semiconductor switch means 28, which comprise normally closed switches, thereby causing the usual build-up of magnetic flux in the ignition coils 82 and 83, respectively. The signals from the solid state distributor 66 cause one of the switches of the semiconductor switch means 28 to open, thus generating a high voltage in the appropriate corresponding secondary winding 86 or 87 which generates the sparks in the appropriate spark plugs 90b or 90a.

Reference power supply 77, as well as the pulse generator 68, are connected to the battery terminal 74 through the ignition switch 76 to provide the necessary power to those circuits. The actual implementation of the above block diagram may be accomplished utilizing either analog or digital circuitry, as will be appreciated by those skilled in the art.

Figure 3A:
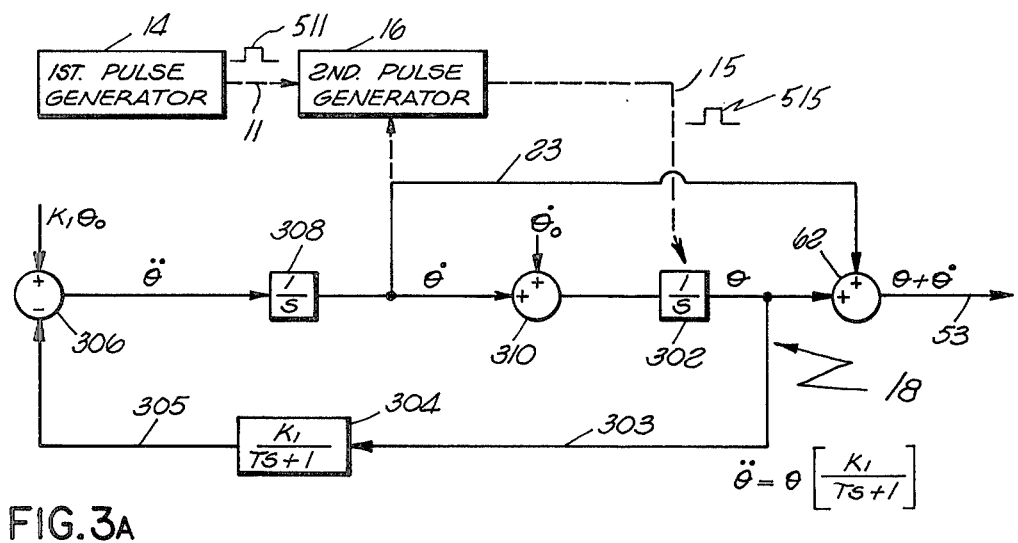
FIG. 3A is a block diagram illustrating the mathematical model for the electronic shaft means of the present invention.

Referring now to FIG. 3A, an illustration of the block diagram of the mathematical model utilized to implement the electronic shaft means 18 (predictive computer loop) is illustrated. The electronic shaft means 18 provides extremely accurate voltage waveforms which are periodically synchronized to the engine's actual crankshaft position. As previously described, a first pulse generator 14 provides the first timing signal 511 along the lead 11 to the second pulse generator 16 which generates synchronization signals 515 along the lead 15. The synchronization signal 515 provided on the lead 15 is operationally coupled to control and synchronize a second integrator 302 to allow the integrator 302 to integrate only during the time period between the trailing edge of each synchronization signal pulse and the next subsequent leading edge of synchronization signal pulse 516 (FIG. 5). The output of the second integrator 302 is coupled along path 303 to a first order lag transfer function 304 which generates an output representative of the acceleration of the engine crankshaft. This acceleration term is coupled along a path 305 to the negative input of a first summing junction 306 where it is subtracted from the initial condition $K_1\theta_0$ to provide a resultant angular acceleration $\ddot{\theta}$ which, when integrated twice, would yield a minimum output at very low engine rmp. Thus, the initial condition $K_1\theta_0$ provides adjustment to the output $\theta$ from the second integrator 302 which may have any desired amplitude to generate a constant amplitude value $\theta$ regardless of engine speed. The second time derivative $\ddot{\theta}$ is coupled to a first integrator 308 which generates a value $\dot{\theta}$ which is the rate of angular speed of the electronic shaft means 18. The rate value from the first integrator 308 is then summed with an initial condition $\dot{\theta}_o$ in a second summing junction 310 with the result being coupled to the second integrator 302 to generate the angular position signal of the electronic shaft means 18.

The initial condition $\dot{\theta}_o$ is required to produce a useful angular position output at relatively low speeds (approximately 200 rpm or lower). The output of the second integrator 302 corresponds to the engine's crankshaft angular position relative to the piston heads of the internal combustion engine but is independently generated by the electronic shaft means 18. The angular rate signal from the output of the first integrator 308 is coupled to the second pulse generator 16 as well as to the third summer or mixer 62 previously described, to provide the necessary composite signal to the variable pulse width generator 22.

Figure 3B:
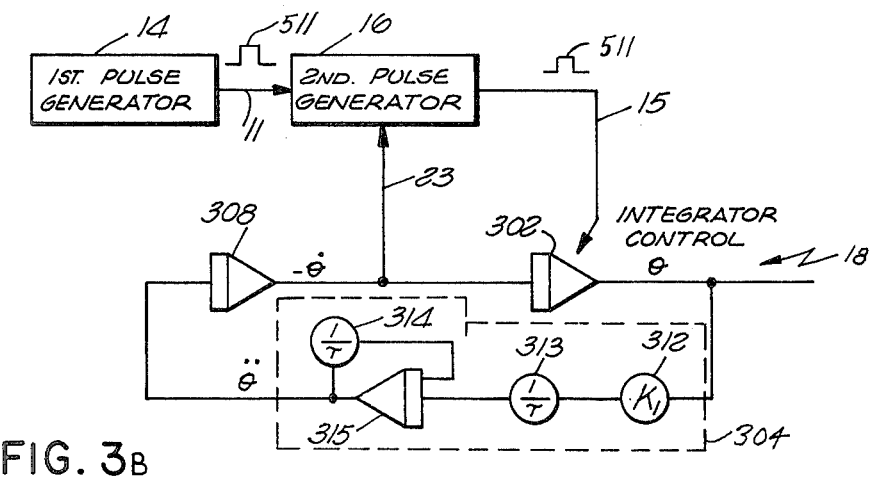
FIG. 3B is an analog computer model representation of the electronic shaft means illustrated in FIG. 3A.

Referring to FIG. 3B, an analog computer loop model of the block diagram illustrated in FIG. 3A is shown. Thus, a first order lag transfer function 304 which generates the acceleration signal $\theta$, is comprised of the first multiplier 312 and a second multiplier 313. A third active integrator 315 which has a second input coupled to a feedback path from the output of the integrator 315 and which includes multiplier 314 to multiply the result by 1/T. The resultant output from the integrator 315 is the second derivative $\ddot{\theta}$ of the electronic shaft means position $\theta$. This value $\ddot{\theta}$ is next integrated in the active (i.e. operational amplifier) integrator 308 to generate the rate signal $\dot{\theta}$ and is integrated again in the active integrator 302 to generate the position signal $\theta$.

Figure 4:
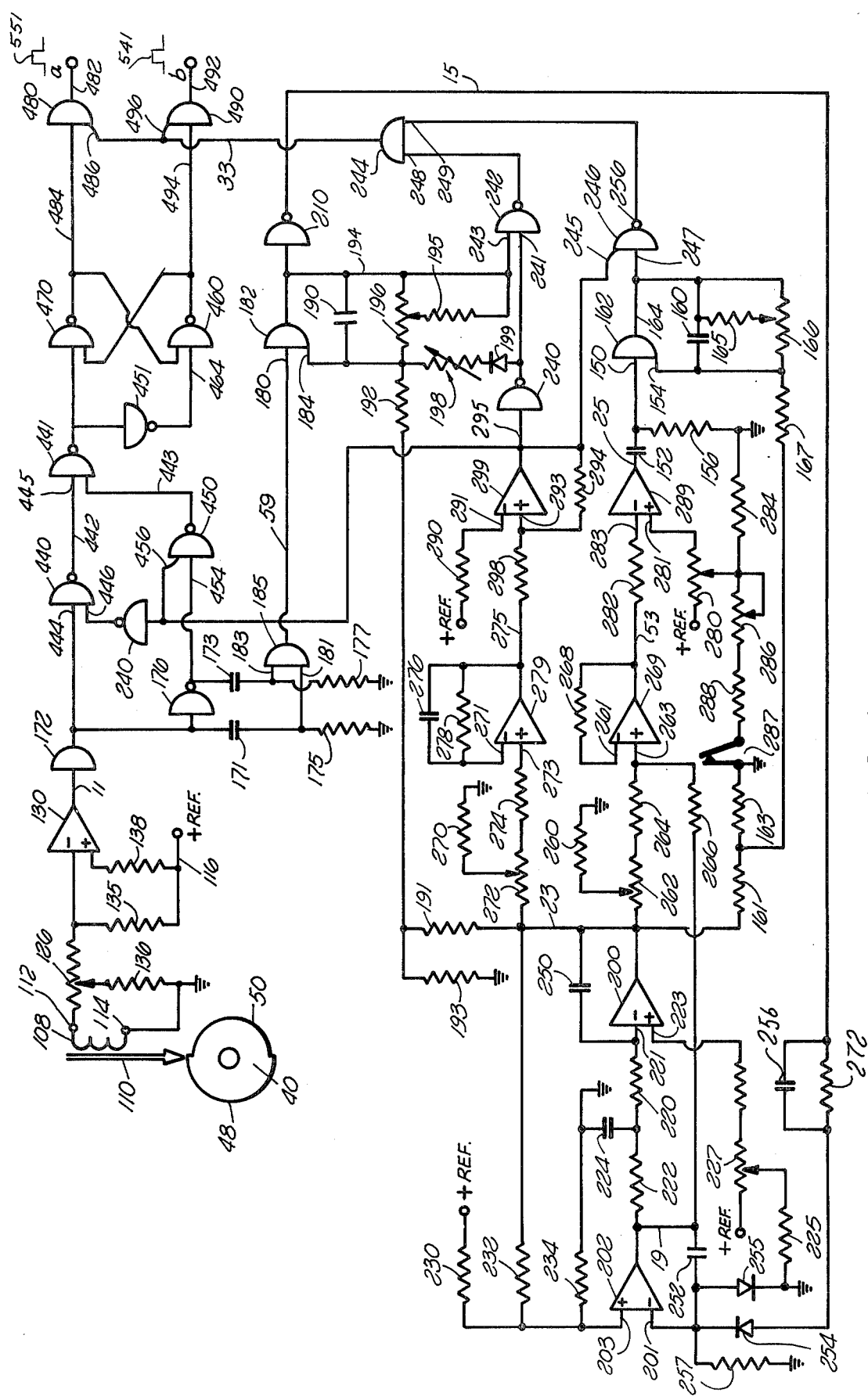
FIG. 4 is a schematic circuit diagram of the circuitry for generating the spark enable signals for the electronic distributor for a four cylinder embodiment of the present invention.

Referring more particularly to FIG. 4, there is illustrated in further detail an electronic ignition system for a four cylinder engine in accordance with the present invention. As therein shown, the electromagnetic pickup 52 includes a coil 108 which is wound upon a core of ferromagnetic material 110 position adjacent to the disc 40. The coil 108 has one terminal 112 connected through a variable resistor 126 to the negative input of an operational amplifier 130, and a second terminal 114 connected to a ground. A resistor 136 connected from ground to the wiper of the variable resistor 126 allows the resistor 126 to provide signal coupling and bias adjustment. A resistor 135, connected from a +5 volt reference voltage bus 116 to the negative input of the amplifier 130 and a resistor 138 connected from the bus 116 to the positive input of the operational amplifier 130, provide additional bias.

As the disc 40 rotates and the lobes 48 and 50 pass the electromagnetic pickup 52, the magnetic flux appearing therein varies, generating pulses which are coupled through the resistor 126 to the negative input of the operational amplifier 130 which amplifies and inverts the pulses. By appropriate positioning of the electromagnetic pickup, the pulses appearing at the output of the amplifier 130 may be generated to have their leading edge occur at approximately 10°, or any other value, before top dead center (TDC) of the pistons of the internal combustion engine. Since the lobes cause a pulse to be generated which remains high or low through 180° of angular rotation of the crankshaft, it can be seen that the rising edge uniquely identifies two cylinders to be provided with a spark while the falling edge uniquely identifies the other or remaining two cylinders to which the spark is to be provided. The output lead of the operational amplifier 130 is thus the lead 11 of the first pulse generator 10 which include all of the aforementioned components.

The output of amplifier 130 is connected by the lead 11 to a buffer AND gate 172 having an output connected to a NAND gate 176 to achieve isolation and inversion of the first timing signal from the lead 11.

The outputs from the gates 172 and 176 are also respectively connected through capacitors 171 and 173 to the inputs 181 and 183, respectively, of an AND gate 185, and to ground through the resistors 175 and 177 to form the leading and trailing edge detector 58 as shown in FIG. 2. The signal on the output lead 59 from the gate 185 comprises a plurality of pulses approximately 100 microseconds duration which occur on the leading and trailing edges of the pulses appearing on the lead 11, as illustrated by the waveform 559 shown in FIG. 5. It will be appreciated, of course, that various polarity arrangements are possible and that the curves shown in FIG. 5 are by way of illustration only and they may be of the opposite polarity from that shown.

The output pulses from the gate 185 are applied by the way of the lead 59 to an input terminal 180 of an AND gate 182. The other terminal 184 of the AND gate 182 is connected to a common point between a capacitor 190 and resistors 192 and 196 and a variable resistor 198. The other terminal of the capacitor 190 and the resistor 196 are connected to an output lead 194 of the AND gate 182.

The AND gate 182 functions as a particular monostable multivibrator which produces an output signal of constant amplitude but variable duration. Under quiescent operating conditions, that is, when no signal appears on the lead 59, the terminal 180 of the AND gate 182 is a logical one which in this particular circuit application is five volts. Under these conditions, if the other input terminal 184 of the AND gate 182 exceeds a threshold voltage, which in this particular application is approximately 1.7 volts, then the output of the AND gate 182 is also high, i.e., at five volts. Upon application of pulses to the lead 11 generated by the electromagnetic pickup 52 as above described, the output of the AND gate 185 produces negative going pulses from +5 volts to zero which are applied to the input terminal 180 of the AND gate 182 causing the output from the AND gate 182 to drop from +5 volts to 0 volts. The input 184, which is coupled to the output of the AND gate 182 through the capacitor 190, immediately goes to zero but then commences charging through the internal resistors which are connected to a +5 volt signal. When the charge across capacitor 190 reaches the 1.7 threshold voltage, the signal at the terminal 180 will have returned to a +5 volt value, thus allowing the output of the AND gate 182 to again go to its logical one state of +5 volts.

When the engine speed is relatively slow, that is, from approximately 0 to 600 rpm, the spark should occur substantially at top dead center of the piston stroke and thus little or no spark timing advance is required. Under these circumstances, the time constant for charging the capacitor 190 is such that the duration of the negative going pulse at the output terminal 194 is equivalent or less than 10° of the engine's crankshaft angle. The variable resistor 198 provides appropriate adjustment to effect this time constant.

The negative going pulse thus generated by the AND gate 182 is applied as an input signal to an inverting NAND gate 210, which provides a positive going pulse signal on a lead 15 from the second variable pulse width generator (controlled AND gate) 60 of the second pulse generator 16 shown in FIG. 2. At relative low engine speeds, this pulse is applied directly to the electronic distributor 66 through the spark signal select means 24 as shown in FIGS. 1 and 2.

In order to provide the required spark advance at higher engine speeds, however, the rate signal generated by the electronic shaft means 18 and representative of the engine crankshaft angular velocity and available at an output lead 23 of an integrator 200 is applied as the feedback control voltage through a resistor 191 and the resistor 192 to the input 184 of the AND gate 182. Resistor 191 is connected between the output lead 23 and ground through a resistor 193. The resistors 191 and 193 act as a voltage divider to provide the appropriate level of control voltage through resistor 192 to thereby effectively decrease the charge time constant for the capacitor 190 by an amount proportional to the feedback control voltage from the integrator 200.

It will now be recognized that as the engine speed increases, a proportional increase in the level of the control voltage is applied to the charge path of the capacitor 190 thereby decreasing its time constant for charging, thus allowing it to reach the threshold of +1.7 volts faster than if no voltage appeared on the lead 23. As a result, the trailing edge of the output pulse from the gate 210 occurs sooner as the engine speed increases with the opposite effect occurring as the engine speed decreases. Thus, a variable pulse width proportional to engine speed is generated at the output of the gate 210.

The variable resistor 196 is connected in parallel with the capacitor 190 to adjust the desired pulse width of the output pulse of the AND gate 182. A resistor 195 is connected between the wiper of the resistor 196 and the output terminal 194 of the AND gate 182. As the wiper on the resistor 196 is adjusted towards the input 184 of the AND gate 182, resistor 195 is effectively placed in parallel with the capacitor 190, thus reducing the control voltage level in the charge path of capacitor 190. Consequently, the time constant required for charging the capacitor 190 is increased thereby slowing the time required to reach the threshold voltage. As a result, the trailing edge of the output pulse from the AND gate 210 occurs later and the pulse duration is increased. As the wiper of the variable resistor 196 is moved towards the output terminal 194 effectively removing resistor 195 from the circuit, the opposite occurs. Thus, variable resistor 196 provides an additional means of adjusting the pulse width of the output pulses from the gate 210.

Although spark timing advance could be accomplished by AND gate 182 as related in my U.S. Pat. No. 3,923,029, filed Apr. 17, 1974, and incorporated herein by reference, the time constant of capacitor 190 provided by the control resistors 192, 195 and 196 is set so that the ratio between the pulse duration of the pulses from the AND gate 182 and the time duration between consecutive input triggering pulses on the lead 59 is maintained at a precise constant. This precision timing pulse, which can be adjusted by the variable resistor 196, is utilized as the control timer for the previously described electronic shaft means 18.

More specifically, the output pulse appearing on lead 15 is applied as a synchronization signal to the electronic shaft means 18 through a resistor 272 connected in parallel with a capacitor 256 which is coupled in series with the forward biased diode 254 to provide the control circuitry to the electronic shaft means 18. The diode 254 is connected to a negative input 201 of an integrating operational amplifier 202 and functions as a switching device to apply the positive going synchronization signal pulse from the NAND gate 210 to drive the output of the integrator 202 to zero volts where it is held through the duration of the pulse. When the synchronization signal pulse on the lead 15 goes to zero, the diode 254 blocks voltages less than +0.5 volts, thus allowing the integrator to integrate all inputs present at the input terminals 201 and 203. Integration occurs through a feedback capacitor 252 connected between the output and the negative input 201 of the integrator 202.

The output of the integrator 202 is connected to the negative input 221 of the integrator 200 through a passive first order lag which comprises a pair of resistors 222 and 220 between which one lead of a capacitor 224 is coupled with its other terminal coupled to ground. The valves of these components are selected to satisfy the time constant T (taken to be 0.05 seconds) as described in conjunction with the mathematical model of FIGS. 3A and 3B.

The initial condition voltage applied to the integrator 200 to adjust the amplitude voltage waveform output from integrator 202, is applied by a variable resistor 227 connected in series with a resistor 229 between the +5 volt reference and the positive terminal 223 of integrator 200. Resistor 225 is connected between the wiper of the resistor 227 and ground thus providing a voltage divider to adjust the aforementioned initial condition. Integration in the integrator 200 occurs through the feedback capacitor 250 connected between the output lead 23 and the negative input terminal 221. The output lead 23 is connected to the positive input terminal 203 of the integrator 202 through a resistor 232 thus completing the loop as described by the mathematical model as shown in FIGS. 3A and 3B.

A resistor 230 connected from the reference voltage to the positive input terminal 203 of the integrator 202 provides the angular rate initial condition as previously described. The resistor 234, connected from ground to the positive input terminal 203 of the integrator 202, provides an appropriate scaling gain to the input voltages from the resistors 230 and 232. A resistor 257 and a diode 255 are connected from ground to the negative input terminal 201 of integrator 202 to provide the appropriate bias for the operation of the integrator 202. The above description thus discloses the preferred embodiment of the predictor loop of the electronic shaft means 18.

The output waveform voltage representing the rate signal 523 and appearing on the output lead 23 from integrator 200 is applied to the positive input terminal 263 of an electronic operational amplifier 269. The waveform voltage appearing on the output lead 19 of integrator 202 representing the position signal 519 is also coupled to the positive input terminal 263 of the amplifier 269 to effect an algebraic summation of the rate and position signals. A resistor 260 is connected between ground and the wiper of a variable resistor 262 coupled between the integrator 200 and terminal 263 to provide an adjustment to the amount of spark advance required by the internal combustion engine. Resistors 264 and 266 are placed between terminal 263 and the respective leads 23 and 19 to provide appropriate biasing. A feedback resistor 268 connected from the output lead 53 to the negative input terminal 261 of the amplifier 269 defines the gain of the amplifier 269. The above components thus define the shaft angle and rate mixer 62 shown in FIG. 2.

The output lead 53 of amplifier 269 is connected to the negative input terminal 283 of a high gain amplifier 289 through a coupling resistor 282 where the output waveform voltage representing the algebraic sum of the position and rate of the electronic shaft means from amplifier 269 is compared to a timing reference voltage representative of the basic timing. The timing reference voltage is provided by a variable resistor 280 connected between the reference potential and the positive input terminal 281 of the amplifier 289. A resistor 284 is coupled between the wiper of the variable resistor 280 and ground to provide the adjustment of the basic idle spark timing required by the internal combustion engine. The wiper of the variable resistor 280 is also connected to the wiper of a variable resistor 286. The variable resistor 286 is coupled in series with a bias resistor 288 and the resistor 284 between ground and a vacuum actuated switch 287 to provide a spark advance correction as determined by the load conditions of the internal combustion engine. The vacuum actuated switch 287 is connected to sense the vacuum appearing at the intake manifold of the engine. Upon the occurrence of a predetermined amount of vacuum at that point, for example, approximately 10 pounds per square inch, the switch 287 will close coupling the resistor 288 in parallel with resistor 284 to the input 281 of the amplifier 289 thus lowering the bias at the wiper of the reference resistor 280. When this bias is compared to the composite waveform voltage output from the amplifier 269, the negative going advance signal pulse appearing on output terminal 25 of amplifier 289 will cause the advance signal pulse to occur sooner thus imparting additional spark timing advance when the internal combustion engine is under no load conditions. Variable resistor 286 connected in series with resistor 288 provides the necessary adjustment as to the amount of additional spark advance. The above-described components thus define the timing advance detector 64, the basic timing means 67 and the vacuum advance bias switch 65 shown in FIG. 2.

The output terminal from amplifier 289 is coupled to an input terminal 150 of an AND gate 162 through the differentiating network comprised of capacitor 152 and resistor 156. The time constant of this network is such as to produce a negative going pulse of 100 microseconds duration at the trailing edge of the output pulse from amplifier 289. The 100 microsecond negative going pulses generated through the coupling capacitor 152, trigger the variable pulse-width AND gate 162 which comprises the first variable pulse width generator 22 as above described. The output voltage waveform of integrator 200, which is representative of the engine speed, i.e., the voltage level increases as engine speed increases, is applied as the control voltage to the variable pulse-width AND gate 162. Resistors 161 and 163 are coupled in series between the output lead 23 of the integrator 200 and ground to provide a voltage divider. The center part between the resistors 161 and 163 is coupled to the terminal 154 of the AND gate 162 to provide the appropriate level of control voltage through a resistor 167. The resistor 167 is also connected to a capacitor 160 coupled between the output lead 164 and the input lead 154 of the AND gate 162, to provide a means of decreasing the time constant required for the capacitor 160 to charge by an amount proportional to the above-mentioned control voltage. It will thus be recognized that, as the engine speed increases, a proportional increase in the control voltage level is applied to the charge path of the capacitor 160, thereby decreasing the time constant required for charging which allows the voltage at the terminal 154 to reach the threshold +1.7 volts faster than before. As a result, the trailing edge of the output pulse from control AND gate 162 occurs sooner. As engine speed decreases, the opposite occurs. Thus, an advance signal having a pulse repetition frequency proportional to engine speed is generated by the AND gate 162.

A variable resistor 166 is also connected in parallel with capacitor 160 having a wiper connected to the output terminal 164 of the AND gate 162 through a resistor 165. As the wiper on resistor 166 is adjusted towards the input terminal 154 of the AND gate 162, it places the resistor 165 in parallel with the capacitor 160 thereby reducing the control voltage level available in the charge path of capacitor 160 and increasing the time constant required for charging and, thus, the time required to reach the threshold of +1.7 volts. As a result, the duration of the output pulse from the controlled AND gate 162 is increased. As the wiper of the variable resistor 166 is moved towards the output terminal 23 thereby effectively removing resistor 165 from the circuit, the opposite occurs.

At relative slow engine speeds (0 to 600 rpm), little or no spark timing advance is required as mentioned previously. Thus, a low rpm detector 63 is provided to generate a control signal which is applied to the spark signal select means 24 as shown in FIG. 2. The low rpm detector is provided as follows:

The rate signal at output terminal 23 from the integrator 200 is connected to the positive input terminal 273 of an amplifier 279 through a variable resistor 272 and a fixed resistor 274. A resistor 270 is connected between the wiper of the variable resistor 272 and ground to provide a voltage divider to adjust the signal level to amplifier 279. A resistor 278 and a capacitor 276 connected in parallel between the output terminal 275 and the negative input terminal 271 of the amplifier 279, provide a first order lag transfer function which preferably has a one second time constant. The ratio of the resistors 278 to 274 determine the gain through amplifier 279 which is ten in the preferred embodiment of the present invention.

The output terminal 275 of amplifier 279 is coupled to the positive input terminal of a very high gain amplifier 299 through a resistor 298 where it is compared to the reference voltage which is connected to the negative input terminal 291 through a resistor 290. As a result, an output voltage level is produced by amplifier 299 which is "low" (approximately +0 volts) if the engine speed is less than about 600 rpm and "high" (approximately +5 volts) if the engine speed is greater than about 600 rpm. A resistor 294, connected between the output terminal 295 and the positive input terminal 293 of the amplifier 299, provides the necessary positive feedback hysteresis to prevent the amplifier 299 from oscillating at the preselected engine speed, e.g., 600 rpm's.

The output terminal 295 of the amplifier 299 is connected to all input terminals of a NAND gate 240 which inverts the signal pulse. At low engine speed, this signal goes to +5 volts and is applied as a control to AND gate 182 through diode 199 and variable resistor 198. This "high" signal level output from the NAND gate 240 is also applied to an input terminal 241 of a NAND gate 242 allowing any signal present at a second input terminal 243 to go through the NAND gate 242 which, in this case, are the second timing signal pulses 515 which come from the output terminal 194 of the AND gate 182. Simultaneously, the "low" signal present at the output terminal 295 of the amplifier 299 is connected to the input terminal 245 of the NAND gate 246 preventing any signal at the input 247 from going through and causing the NAND gate 246 output to go "high" (+5 volts). The output terminal 256 of the NAND gate 246 is connected to the input terminal 249 of the AND gate 244, allowing any signal present at the input terminal 248 to go through AND gate 244.

When the engine speed goes to 600 rpm or over, the output of the amplifier 299 changes to a "high" (+5 volts). This signal is inverted in the NAND gate 240 and allows the AND gate 182 to be controlled by engine speed alone through the resistor 192 as described above. The voltage applied by the resistor 198 is effectively removed by the switching diode 199. The "low" signal from the NAND gate 240 is applied to the NAND gate 242 preventing signals present at the input terminal 243 from going through and causing the output of the NAND gate 242 to go to a "high" (+5 volts). The "high" output signal from the amplifier 299, which is connected to the NAND gate 246, allows the spark advance signal appearing at the input terminal 247, to go through. The "high" signal present at the input terminal 248 of AND gate 244 allows the signal present at the input terminal 249 to go through the AND gate 244. Thus, the gates 240, 242, 256 and 244 comprise the basic components of the spark signal select control 24 and the low rpm limit-select 63 shown in FIG. 2.

The output terminal 33 of the AND gate 244 is connected to input terminals 496 and 486 of AND gates 490 and 480 in the solid state distributor 66, thus providing spark enable pulses to the solid state distributor 66.

Turning now to the solid state distributor 66 described in conjunction with FIG. 2, first timing signal pulses appearing on the lead 11 from the first pulse generator previously described are buffered through an AND gate 172 and inverted in the NAND gate 176. The output of the gate 172 is applied to the input 444 of a NAND gate 440, while the output from the NAND gate 176 is applied to the input 454 of a NAND gate 450. At engine speeds of 600 rpm and over, the "high" (+5 volts) signal output from the spark select amplifier 299 appears at the terminal 295 and is connected to input terminal 456 of NAND gate 450 allowing the first timing signal pulses appearing on input terminal 454 to go through the gate. Simultaneously, the "high" signal from the amplifier 299 is inverted by a NAND gate 240 and applied to an input terminal 446 of the NAND gate 440 preventing any signal appearing on the input terminal 444 from going through and causing the output of the NAND gate on the lead 442 to go to a "high" of +5 volts. This voltage is applied to an input terminal 445 of a NAND gate 441 allowing the first timing signal pulses from the NAND gate 450 appearing at the second input lead 443 to go through the NAND gate 441. When the engine speed falls below 600 rpm, the output signal level from the amplifier 299 becomes "low" and the reverse of the events described above takes place. The object of this circuitry is to provide the appropriate phase relationship between the first timing signal pulses and the advance pulses, appearing on the lead 295 below and above the 600 rpm engine speed.

The synchronizing output pulses from NAND gate 441 are inverted in NAND gate 451 and applied to the reset input terminal 464 of a conventional flip-flop configuration comprised of NAND gates 460 and 470. The output from the NAND gate 441 is also coupled to the set input 474 of the flip-flop. The opposite phase output pulses from this flip-flop are applied to the input terminals 484 and 494 of the AND gates 480 and 490 allowing the spark enable pulses present at the input terminals 486 and 496 to go through when the input synchronizing pulses are "high." The resultant signals from the gates 480 and 490, respectively, provide ignition spark signals to alternate pairs of spark plugs through the spark control switches (not shown) so that the output of the AND gate 480 will have a waveform such as that illustrated by waveform 551 in FIG. 5 and the output of the AND gate 490 will have a waveform such as that illustrated by waveform 541 in FIG. 5 with the inputs or leads 484 and 494 corresponding to the waveform illustrated by waveform 511 in FIG. 5 and its inverse (not shown) respectively.

Figure 10:
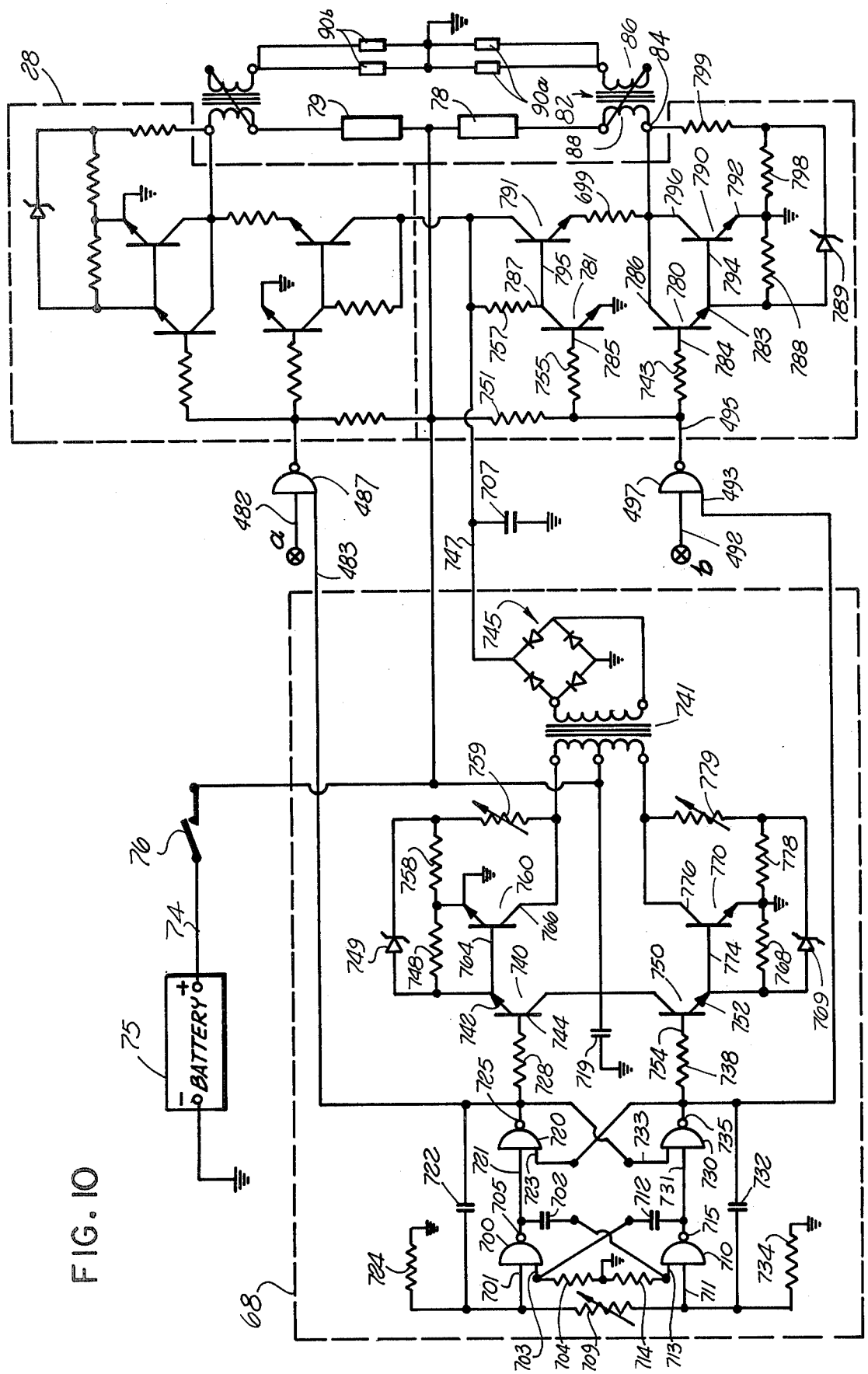
FIG. 10 is a schematic circuit diagram of the power supply converter and semiconductor switch means used in conjunction with the electronic distributor means illustrated in FIG. 1.

Referring now more particularly to FIG. 10, there is illustrated in more detail the pulse generator 68, additional portions of the solid state distributor 66 and the semiconductor switch means 28 in accordance with the present invention applicable to a four cyclinder engine. Thus, the signal 551 appearing on lead 492 is coupled to one input of an AND gate 497 and the signal 541 appearing on the lead 482 is applied to one input of an AND gate 487. As previously described, in the preferred embodiment of the present invention multiple sparks are generated in each of the spark plugs during the duration of each ignition spark signal pulse appearing on the leads 492 and 482. To achieve this goal, the 40 kilocycle pulse generator 68 provides a continuous stream of pulses on leads 493 and 483 respectively. These pulses are ANDed with the respective spark enable signals on the leads 492 and 482 to generate multiple ignition spark signal pulses (FIG. 5) at the outputs of the gates 497 and 487. The multiple ignition spark signal pulses comprise a plurality of high speed pulses, preferably occurring at a 40 kilocycle pulse rate, within an envelope defined by the ignition spark signal pulses appearing on the leads 492 and 482 respectively. Each output of the gates 497 and 487 is then inputted to the semiconductor switching circuit 28 to provide the multiple, alternating polarity, ignition sparks at the ignition spark plugs during the duration of the applied spark enable signal.

The operation of the switching circuitry 28 is hereafter described with reference to just one channel. It will be appreciated, however, that each channel is identical and operates in an identical fashion. Thus, utilizing the output from the AND gate 497 for illustrative purposes, the signal appearing on the output lead 495 of the AND gate 497 is applied to the base 784 of a transistor 780, in a Darlington configuration with a transistor 790, through a resistor 743, causing the transistor 780 to conduct. The emitter 783 of the transistor 780 is connected to the base 794 of transistor 790 while the collectors 786 and 796 of the transistors 780 and 790 are connected to the primary winding terminal 84 of the coil 88 in the ignition transformer 82.

When the transistor 780 conducts current through the base 794 of the transistor 790, it causes a flow of current through the transistor 790 which, in turn, causes a current flow through the primary winding of the ignition coil 82 and a magentic flux develops on the iron core of the coil whenever the distributor spark enable signal is not present. As the distributor spark enable signal is applied to the AND gate 497, the transistors 780 and 790 are cut off, current through the primary winding 88 is cut off, and the magnetic field in the coil's core collapses inducing a high voltage in the secondary winding 86, which is connected directly to spark plugs 90a producing the ignition sparks. Simultaneously, a +200 volt potential from the network 745 along the lead 747 is applied to the primary winding 88 at terminal 84 of ignition transformer 82 through resistor 699 and transistor 791 inducing a reinforcing high voltage on the secondary winding 86 of coil 82 that prolongs the spark current duration at the spark plugs.

A resistor 788 is connected from the base terminal 794 to the emitter terminal 792 of the transistor 790 for circuit stability. Resistors 799 and 798 are connected in series between the terminal 84 of the coil 82 and ground to provide a voltage divider to the voltage reference zener diode 789. The anode of the zener diode 789 is connected to the base terminal 794 of the transistor 790 and causes the transistor to conduct when the voltage at the voltage divider is the same as the zener diode's reference voltage. This limits the potential at the collector terminal 796 to approximately 200 volts and, thus, protects the transistor 790 from transient overvoltages produced at the time of the spark.

Coupling resistors 743 and 755 are connected from the output terminal 495 of the NAND gate 497 to the base terminals 784 and 785 of transistors 780 and 781, respectively. A resistor 751, connected to the battery voltage line 74, provides additional base current through the resistors 743 and 755. The +5 volt signal from the NAND gate 497, applied through coupling resistors 753 and 755, will cause transistors 780 and 781 to conduct. The collector terminal 787 of transistor 781, which is connected to the base terminal 795 of a transistor 791, will effectively be at ground potential and, thus, prevent transistor 791 from conducting at the same time transistor 790 is conducting. However, when the output signal from the NAND gate 497 goes "low," the transistors 781, 780 and 790 are cut off and a current is allowed to flow through a load resistor 757 which is connected between supply bus 747 and base terminal 795 of the transistor 791 causing it to conduct.

In the event that the electronic ignition system is applied to a six or an eight cylinder engine, additional identical semiconductor switches will be required, one for each pair of spark plugs.

Turning to the 40 KC pulse generator 68 as illustrated in FIG. 10, NAND gates 700 and 710 have output terminals 705 and 715 connected to input terminals 721 and 731 of the NAND gates 720 and 730, respectively. The output terminals 725 and 735 of the gates 720 and 730 are connected to the inputs 733 and 723 of the gates 730 and 720, respectively, in a flip-flop configuration, except that the outputs 725 and 735, respectively, are fed back to the input terminals 701 and 711 through capacitors 722 and 732, which together with resistors 724 and 734 coupled between ground and inputs 701 and 711, respectively, form the time constant that determines the pulse duration when the charge on the capacitors reach the threshold voltage of +1.7 volts. The value of these components is selected to determine the appropriate time constant that produces the 40 KC pulse repetition frequency. Variable resistor 709, also connected between input terminals 701 and 711, provides fine adjustment of this frequency. The output terminals 705 and 715 of the NAND gates 700 and 710 are connected to the input terminals 713 and 703, respectively, through capacitors 702 and 712 which together with resistors 714 and 704 coupled between the terminals 713 and 703 detect the trailing edge of the pulses appearing on the output terminals 705 and 715. These negative going signals are applied to the NAND gates 700 and 710 to initiate the pulses appearing on the output terminals 725 and 735 of the NAND gates 720 and 730 and, thus, generate the 40 KC pulses of pulse generator 68.

The output terminals 725 and 735 of the NAND gates 730 and 720 are connected to the bases 744 and 754 of npn driver transistors 740 and 750 through coupling resistors 728 and 738. The emitters 742 and 752 of the transistors 740 and 750 are connected to the bases 764 and 774 of transistors 760 and 770. The collectors 766 and 776 of the transistors 760 and 770 are connected to the primary coil of transformer 741 with a center tap terminal 729 connected to the positive terminal of the battery 75 through ignition switch 76 to form a power push pull amplifier configuration.

Variable resistors 759 and 779, connected between the collector terminals 766 and 776 and ground through resistors 758 and 778, provide voltage dividers. The point between the resistors 758 and 759 is coupled through a voltage reference diode 749 to the base 764 of the power transistor 760 and the point between the resistors 778 and 779 is coupled through a reference diode 769 to the base of the power transistor 770. Resistors 748 and 768 coupled between ground and the emitters 742 and 752 of the transistors 740 and 750, respectively, assure the proper voltage stability to power transistors 760 and 770. The voltages thus applied will produce autoregulation as well as protection from the pulse transients which exceed the breakdown voltage specifications of the power transistors.

The required regulated power supplied to the respective switching circuits along the lead 747 is provided by an appropriate diode bridge arrangement 745 well known in the art and is also provided with a filtering capacitor 707 coupled between the lead 747 and ground as is well known in the art. Finally, appropriate filtering is also provided by a capacitor 719 coupled between ground and the collectors of the respective power transistors 740 and 750 and the tap 729 on the transformer 741.

Referring momentarily to FIG. 5, the described pulse generation circuitry and semiconductor means provides a multiple signal as illustrated by the waveform 533 within an envelope defined by one of the pulses 530 in the signal 529, wherein the spark plug is caused to spark about 200 times for each spark enable signal. Further, the above-described circuitry allows the voltage across the spark plug's (electrodes) gap to be maintained at a higher level than previously achieved thereby causing higher spark energy and thus more efficiency in the combustion process.

While the above description has been made with particular reference to a four cylinder engine, the present invention is easily adapted to either a six or eight cylinder engine as well. For example, in the event the apparatus is applied to a six cylinder engine, the present invention may be implemented as shown in FIG. 6. The required synchronization signals from the crankshaft of the engine may be provided by incorporation of a pair of iron discs 640 and 641 with a pair of electromagnetic pickups 645 and 646 provided to detect electromagnetic discontinuities as the crankshaft rotates the discs 640 and 641, respectively. On one of the discs, for example, the disc 640, three lobes 642a, 642b and 642c having a width of approximately 10°, are disposed 120° apart around the circumference of the disc 640. The second disc, for example, disc 641, incorporates but a single lobe 643 on the circumference of the disc 641 having a width of 120°. The discs are then connected to the crankshaft so that the end of the 120° lobe 643 on the disc 641 coincides with the end of one of the 10° wide lobes 642 on the disc 640. The magnetic pickups 646 and 645 are then placed at top dead center relative to the piston about to be fired. In a manner similar to that previously described in conjunction with the four cylinder engine embodiment of the present invention, the coils incorporated as a part of the electromagnetic pickups 645 and 646 have one terminal coupled to ground and the other terminal respectively coupled to the negative input of an operational amplifier 657 and 656 through variable resistors 647 and 648, respectively. The wipers of the variable resistors 647 and 648 are respectively coupled to ground through resistors 649 and 650 to allow appropriate signal coupling and bias adjustment. Also provided are the resistors 653 and 654 respectively coupled between a reference voltage and the positive inputs of the operational amplifiers 657 and 656. Additional bias is provided by the resistors 651 and 652 respectively coupled between the reference and the negative inputs of the operational amplifier 657 and 656.

Figure 7:
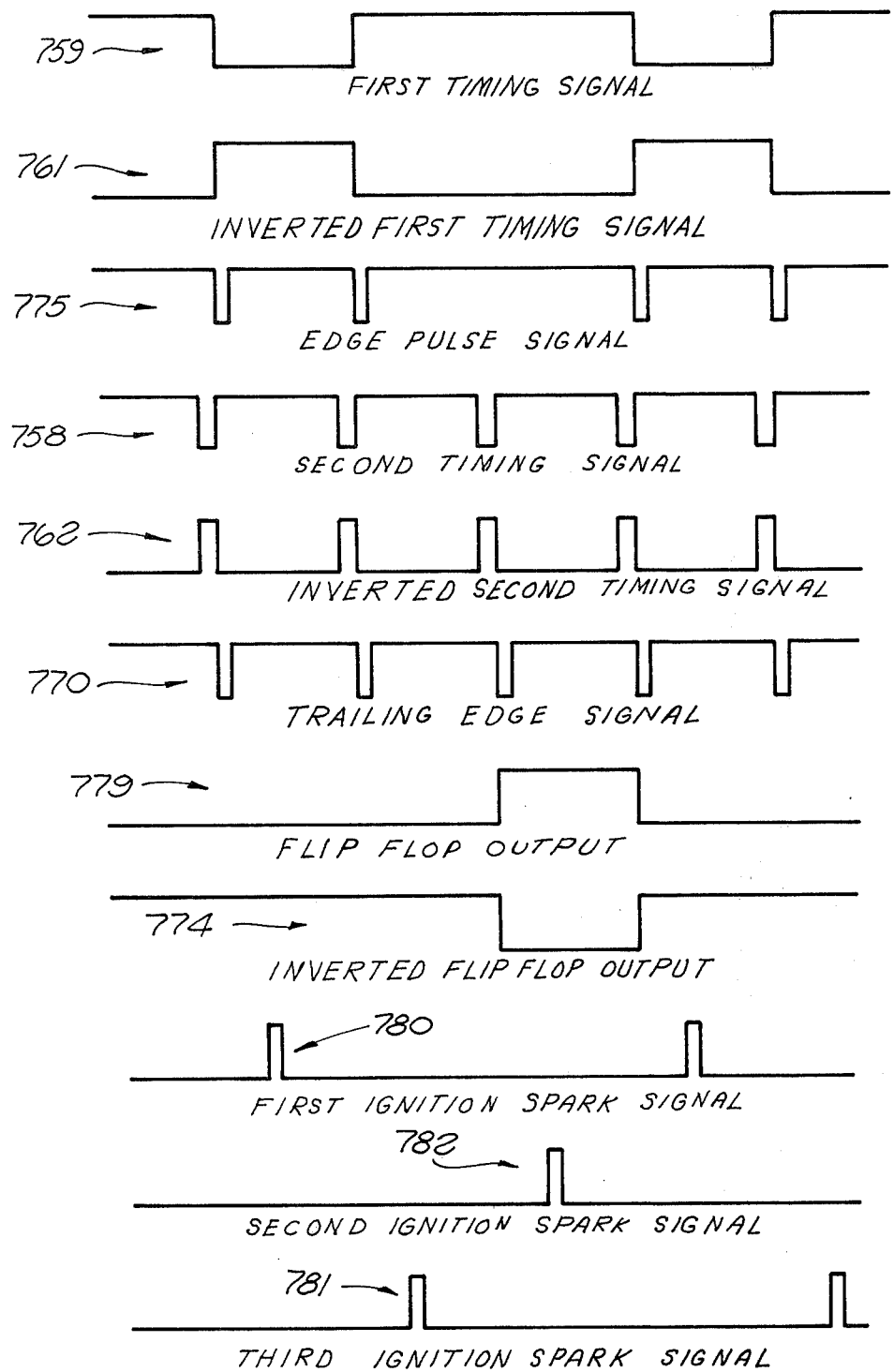
FIG. 7 is a diagram illustrating waveforms taken at various points in the circuit shown in FIG. 6.

As previously described, a variation in magnetic flux sensed by the electromagnetic pickups 645 and 646 as the discs 640 and 641 rotate, generate pulses on the output leads 659 and 658 from the operational amplifiers 657 and 656, respectively. Referring to FIG. 7, the first timing signal appearing on the lead 659 is represented by the waveform 759 while the second timing signal appearing on the lead 658 is respresented by the waveform 758. The signal 759 appearing on the lead 659 is inverted in a gate 661 to generate an inverted first timing signal represented by the waveform 761 on the lead 663. The signal on the lead 663 is coupled to a trailing edge detector comprised of a capacitor 667 coupled between the output of the gate 661 and one input of a gate 671, a resistor 665 coupled between ground and the first input of the gate 671, a second resistor 673 coupled between ground and the second input of the gate 671, and a second capacitor 669 coupled between the output of the gate 671 and the second input of the gate 671. The output edge pulse signal 775 from the gate 671 appearing on the lead 675 and illustrated in FIG. 7, is then coupled to the set input of a D-type flip-flop arrangement 677, previously described, to form a flip flop output signal 779 on the lead 679 illustrated in FIG. 7.

The signal on the lead 658 is inverted in an inverter 660. The resultant inverted second timing signal 762 illustrated in FIG. 7, is coupled through a capacitor 664 to a gate 666. The input to the gate 666 is also coupled to ground through a resistor 668 to provide a second trailing edge detector. The output from the gate 666 on the lead 670 is a trailing edge signal 770 illustrated in FIG. 7, is coupled to one input of an AND gate 672 which has a second input coupled to the lead 675 from the gate 671. An output lead 674 from the gate 672 is coupled to the reset terminal of the flip-flop 677 to generate a inverted flip flop output signal 774 on the lead 678 (FIG. 7).

The signal on the lead 670 is also coupled through the circuitry previously described and represents that first timing signal from which the spark enable signal is generated on the lead 33 as previously discussed in conjunction with the four cylinder embodiment.

The spark enable signal on the lead 33 is ANDed with the signal on the lead 663 in a gate 680 to provide a first ignition spark signal to a first pair of spark plugs. The signal from the flip-flop 677 on the lead 679 is ANDed with the output spark enable signal on the lead 33 in gate 681 to generate a second ignition spark signal at a second different time for a second pair of spark plugs; and, finally, the output spark enable signal on lead 33 is ANDed with the inverse of the signal on the lead 663 obtained by an inversion in an inverter gate 683, the reset output from the flip-flop 677 on the lead 678 in a gate 682 to obtain a third ignition spark signal on a third lead for a third pair of spark plugs. The first, second and third ignition spark signals 780, 781, and 782 from the gates 680 and 681 and 682, respectively, are shown in FIG. 7.

Figure 9:
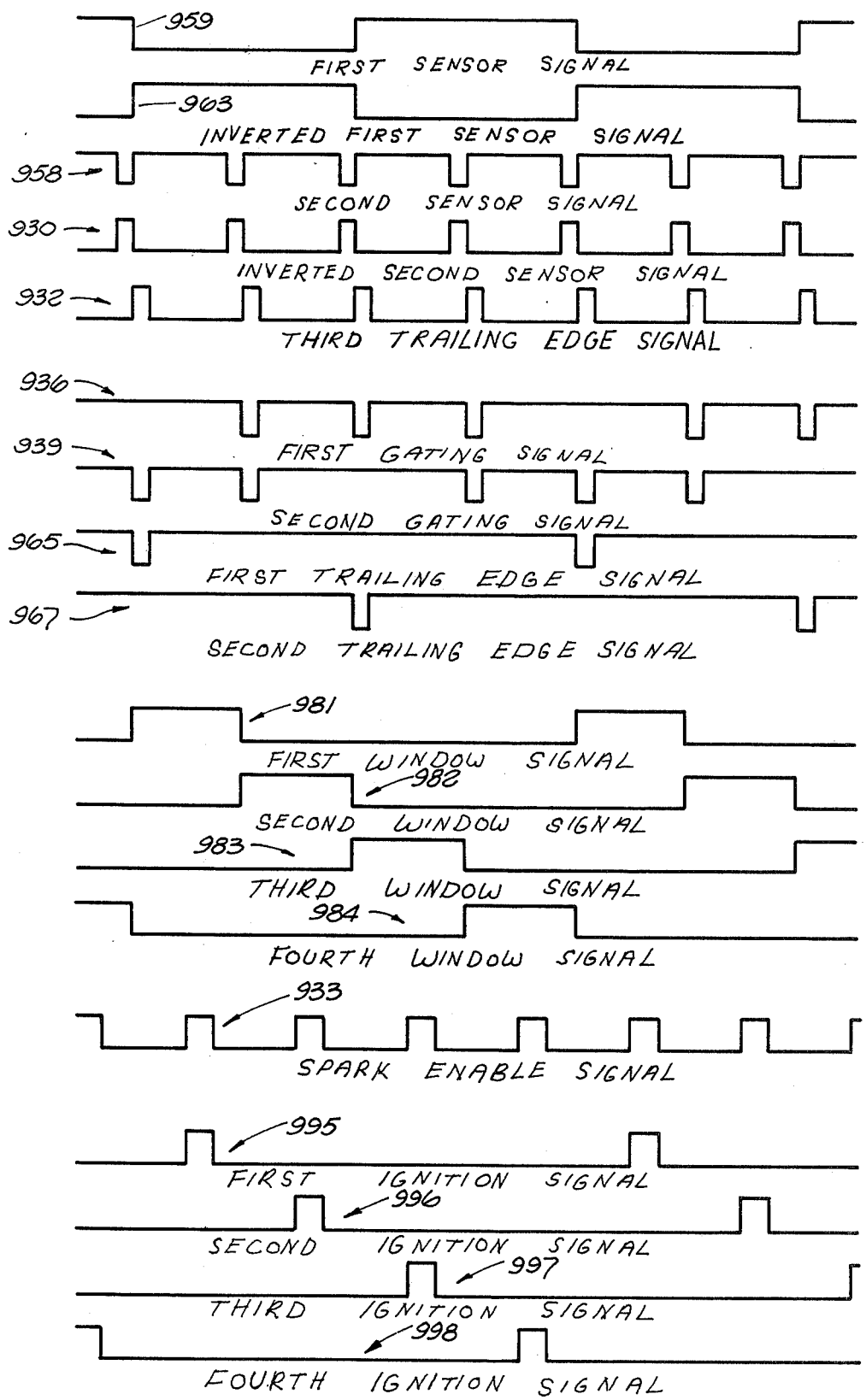
FIG. 9 is a diagram illustrating waveforms taken at various points throughout the circuit shown in FIG. 8.

Referring now to FIGS. 8 and 9, the embodiment of the present invention for an eight cylinder engine is shown. The configuration of the electromagnetic pickup and the associated resistor networks and amplifiers is identical to the arrangement illustrated and described in conjunction with FIG. 6, except that the disc 641 now incorporates a lobe 843 180° wide rather than 120° wide. In addition, the disc 640 is provided with four lobes 842a–d about 10° wide and separated by 90° around the periphery of the disc 640. A first sensor signal 959 is thus generated on lead 659. The lead 659 from the amplifier 657 is then coupled to a gate 861 to generate an inverted first sensor signal 963 on a lead 863. The output from the gate 861 on the lead 863 is then coupled to a trailing edge detector 865 having an identical configuration to the trailing edge detector described in conjunction with FIG. 6 for the six cylinder embodiment. The lead 863 from the gate 861 is also coupled to an inverter 870 whose output is likewise input to a second trailing edge detector 867 which again is identical to the trailing edge detector previously described in conjunction with the six cylinder embodiment. The first trailing edge signal 965, first sensor signal 959, and the second trailing edge signal 967 from the trailing edge detector 867, which generates a pulse upon the occurrence of the trailing edge of the inverted first sensor signal, are illustrated in FIG. 9.

The output from the amplifier 656 is coupled along lead 658 to the input of a gate 830 whose output is coupled to a third trailing edge detector 871, identical to the corresponding trailing edge detector described in conjunction with FIG. 6, to generate a third trailing edge signal 932 on the lead 832. The resultant second sensor signal 958 on the lead 658 and the inverted second sensor signal 930 are represented in FIG. 9.

In order to obtain the appropriate gating signals, the output from the trailing edge detector 865 along with the output from the trailing edge detector 871 are coupled to the respective inputs of a gate 835 to generate a first gating signal 936 on the lead 836. This signal is then coupled to the reset input of a flip-flop configuration 840. The set input of the flip-flop configuration 840 is coupled to the output of the first trailing edge detector 865.

In a similar fashion, the output of the third trailing edge detector 871 on the lead 832 is coupled along with the output from the second trailing edge detector 867 to the respective inputs of an AND gate 837 to generate a second gating signal 939 on the lead 839. The lead 839 is then coupled to the reset input of a second flip-flop arrangement 841 with the set input of the flip-flop 841 being coupled to the output of the second trailing edge detector 867.

The appropriate window signals to enable the output spark enable pulses on the lead 33 may be generated as follows. The first window signal 981 may be obtained from the Q output of the flip-flop 840 on a lead 881. To obtain a second window signal, the output from the gate 870 is ANDed with the Q̄ output from the flip-flop 840 in the AND gate 875 to generate a signal on the lead 882. The third window signal 983 is available on the lead 883 which is the Q̄ output from the flip-flop 841. To obtain the fourth window signal 984, the output from the gate 861 on the lead 863 is ANDed with the Q̄ output from the flip-flop 841 in an AND gate 876 to generate the appropriate signal on the lead 884.

In order to sequentially direct a spark signal to the four pairs of cylinders in an eight cylinder engine, the respective window signals appearing on the leads 881, 882, and 884 are ANDed with the spark enable signal 933 (FIG. 9) appearing on lead 33 in the gates 891, 892, 893 and 894, respectively. The resultant first, second, third and fourth ignition signals 995, 996, 997 and 998 appearing on leads 895, 896, 897 and 898 from the respective AND gates 891, 892, 893 and 894 are illustrated in FIG. 9.

Although the particular circuitry described in conjunction with the various embodiments of the present invention are preferred, it will be appreciated that many other arrangements of the components could be devised without departing from the teaching of the present invention.

SUMMARY OF SYSTEM OPERATION

With particular reference to FIG. 2, it can be seen from the foregoing that as the disc 40 is rotated by the crankshaft 42, a voltage signal is generated by the electromagnetic pick-up 52 as each of the discontinuities in the disc pass by. This signal which contains information from which the angular position and angular speed can be obtained as well as the identity of the particular cylinder which is firing, is then amplified by the pulse shaper 56.

The discontinuities in the disc are equally spaced at its periphery and the number thereof equal to the number of spark plugs fired per revolution of the engine. The signal from the pulse amplifier and inverter 56 is then utilized to generate a variable pulse width signal in a second pulse generator 16 to provide the basic synchronization for the pulses of the ignition system. This signal is also coupled as control synchronization to the electronic shaft means 18 which internally generates a rate signal substantially equivalent to the rotational rate of the crankshaft and a position signal representative of the angular position of the crankshaft. These signals are combined in an angle and rate mixer 62 to generate a signal which has an amplitude proportional to the rate of rotation of the engine. By comparing this signal against a constant reference signal representative of the basic timing, the point at which the composite signal from the angle and rate mixer 62 will exceed the basic timing reference voltage will be advanced in time as the voltage level of the composite signal is increased. The resultant advanced signal pulse is proportional to the engine speed and is input into a first variable pulse width generator 22 which allows the pulse width as measured from the leading edge, to be adjusted for optimal engine performance. The resultant spark advance signal is then coupled to a solid state distributor which, in conjunction with signals from the first pulse generator electronics 14, generates sequential signals on a plurality of leads, each of the leads being coupled to a pair of spark plugs.

Also provided in the present invention is a modulation source to provide multiple sparks for each spark plug during the duration of the spark enable signal. In addition, by causing a spark to occur in two spark plugs simultaneously, ignition is provided to the cylinder in the ignition phase and additional burning is provided to the corresponding cylinder in the exhaust stage to provide a cleaner burning engine.

There has thus been disclosed an improved, novel electronic spark ignition system providing automatic electronic spark advance depending upon the engine speed and additionally incorporating a solid state distributor to thereby provide a cleaner, more efficiently burning engine.

What is claimed is:

1. An electronic ignition system for an internal combustion engine having a plurality of cylinders with reciprocating pistons therein, each operating over a combustion cycle in response to ignition pulses and further having a crankshaft, comprising:

electromagnetic sensor means for sensing the rotation of said engine crankshaft and generating at least one first timing signal having pulses with transitions corresponding to unique positions of the pistons in the combustion cycle, and synchronization signal pulses having rising edges occurring on each transition of the first timing signals, whereby the pulse repetition rate of the synchronization signal is representative of the angular speed of the crankshaft;

electronic shaft means for generating a rate signal independent from but representative of the rate of rotation of said crankshaft and a position signal independent from but representative of the angular position of said crankshaft, the position signal being periodically synchronized to the crankshaft position by said synchronization signal pulses, the rate signal being coupled to the electromagnetic sensor means for defining a falling edge for each synchronization pulse;

reference voltage means for providing a reference voltage representative of the basic engine timing;

pulse generator means for adding said rate signal and said position signal and comparing the result against said reference voltage for generating a spark advance signal having a plurality of pulses each having a leading edge advanced by an amount proportional to the engine speed as determined by the value of the rate signal;

select means for selecting and outputting a selected one of the synchronization signal pulses or spark advance signal, the outputted signal being a spark enable signal; and distributor means for electronically combining said first timing signal and said spark enable signal for sequentially directing said spark enable signal to each of a plurality of leads coupled to said internal combustion engine for providing said ignition pulses.

2. The electronic ignition system of claim 1 wherein said distributor means comprises logic means for simultaneously applying said spark enable signal to two selected cylinders, the selected cylinders being 180° out of phase relative to each other in their respective combustion cycle.

3. The electronic ignition system of claim 1 wherein said electronic shaft means comprises:
a first order lag means for generating an acceleration signal representative of the acceleration of said crankshaft;
a first integrator means for integrating said acceleration signal and obtaining the rate signal; and
second integrator means for integrating said rate signal and obtaining the position signal, said position signal coupled as the input to the first order lag means, said second integrator being initiated by one of the rising or falling edges of the periodic synchronization signal pulses and reset by the other of the rising or falling edges of said periodic synchronization signal pulses.

4. The electronic ignition system of claim 1 wherein the select means comprises:
low rpm limit means coupled for receiving said rate signal and generating a control signal having a first value when the rate signal is at or below a predetermined value and having a second value when the rate signal is above the predetermined value; and
spark signal select means for enabling said synchronization signal pulses as the spark enable signal when said control signal is at the first value and enabling said spark advance signal as the spark enable signal when said control signal is at the second value.

5. An electronic ignition system for generating sparks for combustion of gases in an internal combustion engine having a plurality of cylinders with reciprocating pistons therein, each operating over a combustion cycle in response to ignition pulses and further having a rotatable crankshaft, said system comprising:
first pulse generator means for generating at least one first timing signal, each having a plurality of pulses having rising and falling edges for identifying the positions of the pistons in the combustion cycle, said pulses of the first timing signals occurring at a frequency proportional to the speed of said engine;
second pulse generator means coupled for receiving at least one of the first timing signals and generating therefrom a synchronization signal having a plurality of pulses each initiated by the rising or falling edge of the first timing signals and having a variable pulse width for maintaining a substantially constant ratio between the width of the synchronization signal pulses and the time interval between the leading edges of consecutive synchronization signal pulses;
electronic shaft means coupled to the second pulse generator means, the electronic shaft means independently generating a position signal, in synchronization with the synchronization signal pulses, representative of the angular position of said rotating crankshaft and further generating a rate signal from the position signal representative of but independent of the rate of angular rotation of said rotating crankshaft, said rate signal coupled to said second pulse generator for controlling the duration of said synchronization signal pulses for maintaining said constant ratio;
reference voltage generation means for providing a reference voltage defining the basic idle timing of said engine;
pulse generator means coupled for receiving said position signal, said rate signal and said reference voltage and generating therefrom spark advance signal pulses, each having an edge advanced relative to the leading edge of said first timing signal, the amount of advance being proportional to the value of said rate signal;
select means for selecting and outputting a selected one of the synchronization signal pulses or spark advance signal pulses, the outputted signal being a spark enable signal; and
distributor means coupled for receiving the spark enable signal for generating ignition signals and sequentially applying said ignition signals to at least one of said cylinders for producing a spark therein.

6. The electronic ignition system of claim 5 wherein said distributor means is further coupled for receiving said first timing signals and further comprises electronic logic means for combining said first timing signals with said spark enable pulses for sequentially generating the ignition signals on a plurality of leads each coupled to receive one of said sequentially generated ignition signals for sequentially providing sparks in the cylinders of said engine.

7. The electronic ignition system of claim 5 wherein said electronic shaft means comprises:
a first order lag means for generating an acceleration signal representative of the acceleration of said crankshaft;
a first integrator means for integrating said acceleration signal and obtaining the rate signal; and
second integrator means for integrating said rate signal and obtaining the position signal, said position signal coupled to the input of the first order lag means, said second integrator being initiated by one of the rising or falling edges of the synchronization signal pulses and reset by the other of the rising or falling edges of said synchronization signal pulses.

8. The electronic ignition system of claim 5 wherein the select means comprises:
   low rpm means coupled for receiving said rate signal and generating a control signal having a first value when the rate signal is at or below a predetermined value and having a second value when the rate signal is above the predetermined value; and
   spark signal select means for enabling the synchronization signal pulses as the spark enable signal when said control signal is at the first value and enabling said spark advance signal as the spark enable signal when said control signal is at the second value.

9. An electronic ignition system for an internal combustion engine having a crankshaft and a plurality of chambers comprising:
   first pulse generator means for sensing the rotational motion of the crankshaft and generating first timing pulses having a pulse repetition rate representative of the angular speed of the crankshaft, the first timing pulses having leading edges representative of at least two identifiable and unique angular positions of the crankshaft;
   second pulse generator means coupled for receiving said first timing pulses and generating therefrom synchronization signal pulses each being initiated by a rising or falling edge of the first timing signal and having a variable pulse width for maintaining a substantially constant ratio between the width of the synchronization signal pulses and the time interval between the leading edges of consecutive synchronization signal pulses;
   electronic shaft means coupled for receiving said synchronization signal pulses and initiating therefrom the generation of a position signal representative of but independent from the angular position of said rotating crankshaft and further generating a rate signal from the position signal representative of but independent from the rate of angular rotation of said rotating crankshaft;
   summing means for adding said rate signal and said position signal to obtain a composite signal;
   basic timing reference voltage means for providing a reference voltage;
   comparing means for comparing said composite signal against said reference voltage and initiating an advance signal pulse whenever said composite signal increases to a value equal to said reference voltage;
   pulse width generator means for modifying the pulse width of said advance signal pulses to generate therefrom spark enable signal pulses having leading edges coincident with the leading edges of said advance signal pulses; and
   distributor means for sequentially directing said spark enable signal pulses to a plurality of leads, each lead coupled to provide a spark generating signal to at least one chamber of said engine.

10. An electronic ignition system for generating sparks for combustion of gases in an internal combustion engine having a plurality of cylinders with reciprocating pistons therein, each operating over a combustion cycle in response to ignition pulses and further having a rotatable crankshaft, said system comprising:
   first pulse generator means for generating at least one first timing signal, each having a plurality of pulses having rising and falling edges for identifying the positions of the pistons in the combustion cycle, said pulses of the first timing signals occurring at a frequency proportional to the speed of said engine;
   second pulse generator means coupled for receiving at least one of the first timing signals and generating therefrom a synchronization signal having a plurality of pulses each initiated by the rising or falling edge of the first timing signals and having a variable pulse width for maintaining a substantially constant ratio between the width of the synchronization signal pulses and the time interval between the leading edges of consecutive synchronization signal pulses;
   electronic shaft means coupled to the second pulse generator means, the electronic shaft means independently generating a position signal, in synchronization with the synchronization signal pulses, representative of the angular position of said rotating crankshaft and further generating a rate signal from the position signal representative of but independent of the rate of angular rotation of said rotating crankshaft, said rate signal coupled to said second pulse generator for controlling the duration of sid synchronization signal pulses for maintaining said constant ratio;
   reference voltage generation means for providing a reference voltage defining the basic idle timing of said engine;
   pulse generator means coupled for receving said position signal, said rate signal and said reference voltage and generating therefrom spark advance signal pulses, each having an edge advanced relative to the leading edge of said first timing signal, the amount of advance being proportional to the value of said rate signal, the ratio between the width of the pulse and the interval between leading edges of consecutive pulses being substantially constant;
   select means for selecting and outputting a selected one of the synchronization signal pulses or spark advance signal pulses, the outputted signal being a spark enable signal; and
   distributor means coupled for receiving the spark enable signal for generating ignition signals and sequentially applying said ignition signals to at least one of said cylinders for producing a spark therein.

* * * * *